Oct. 21, 1952 R. M. CAIN 2,614,846

AUTOMATIC VOICE RECORDER

Filed March 16, 1949 22 Sheets-Sheet 1

INVENTOR.
ROBERT M. CAIN

BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 2

INVENTOR.
ROBERT M. CAIN

BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 3

INVENTOR.
ROBERT M. CAIN

BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 4

INVENTOR.
ROBERT M. CAIN

BY Ostrolenk & Faber
ATTORNEYS

AUTOMATIC VOICE RECORDER

Filed March 16, 1949 22 Sheets-Sheet 5

INVENTOR.
ROBERT M. CAIN

BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 6

INVENTOR.
ROBERT M. CAIN

BY Ostrolenk & Faber
ATTORNEYS

AUTOMATIC VOICE RECORDER

Filed March 16, 1949 22 Sheets-Sheet 7

INVENTOR.
ROBERT M. CAIN

BY Ostrolenk & Faber
ATTORNEYS

INVENTOR.
ROBERT M. CAIN

BY Ostrolenk + Faber
ATTORNEYS

Oct. 21, 1952 R. M. CAIN 2,614,846

AUTOMATIC VOICE RECORDER

Filed March 16, 1949 22 Sheets-Sheet 9

INVENTOR.
ROBERT M. CAIN

BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 10

INVENTOR.
ROBERT M. CAIN

BY Ostrolenk + Faber
ATTORNEYS

INVENTOR.
ROBERT M. CAIN

BY Ostrolenk & Faber
ATTORNEYS

INVENTOR.
ROBERT M. CAIN

BY Ostrolenk & Faber
ATTORNEYS

INVENTOR.
ROBERT M. CAIN

BY Ostrolenk & Faber
ATTORNEYS

INVENTOR.
ROBERT M. CAIN
BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 15

INVENTOR.
ROBERT M. CAIN

BY Ostrolenk & Faber
ATTORNEYS

INVENTOR.
ROBERT M. CAIN
BY Ostrolenk & Faber
ATTORNEYS

| SWITCHES | IDLE | | COIN DROPS | LOADING ARM OPERATES | | LOADING ARM COMPLETES ITS FUNCTION | RECORDING ARM PLACEMENT | |
|---|---|---|---|---|---|---|---|---|
| | CONTACTS ENGAGED | FUNCTION | | CONTACTS ENGAGED | FUNCTION | | CONTACTS ENGAGED | FUNCTION |
| STEPPING SWITCH 1 FRONT | | | | | | | | |
| 1 REAR | | | | | | | 11 | PUTS DC ON LOADER ARM MOTOR THRU C-1 (FOR BRAKING) |
| 2 FRONT | | | | | | | | |
| 2 REAR | 4 | PREPARES ELEVATOR MOTOR FOR OPERATION WHEN B-2 IS CLOSED | | 1 AND 4 | ENERGIZES AMPLIFIER PREPARES ELEVATOR MOTOR FOR OPERATION WHEN B-2 IS CLOSED & ENERGIZES D.C. POWER SUPPLY. | | 1 AND 4 | |
| 3 REAR | 1 | PREPARES SLUG REJECTOR COIN RETURN RELAY WHEN B-1 IS CLOSED, COIN WILL THEN BE ACCEPTED. | | 2 | ENERGIZES LOADER ARM MOTOR TO LOAD RECORD ON TURNTABLE | | 3 | ENERGIZES CUTTER ARM CONTROL MOTOR TO PLACE CUTTING ARM OVER EDGE OF RECORD |
| 4 FRONT | | | | | | | | |
| 4 REAR | 1 | LIGHTS #1 SIGNAL PANEL "DROP QUARTER IN SLOT BELOW" | | 2 | LIGHTS #2 SIGNAL PANEL "WILL PLACE BLANK RECORD ON TURNTABLE" | | 3 | LIGHTS #3 SIGNAL PANEL "LIFT TELEPHONE WHEN TURNTABLE ROTATES" |
| A | 1 (OPEN) | SOLENOID S DE-ENERGIZED | COIN CLOSES A-2 MOMENTARILY. 2 SOLENOID IS ENERGIZED THEN DE-ENERGIZED TO STEP TO NEXT POSITION | OPEN | | | OPEN | |
| C | 1 | OPEN CIRCUIT SINCE C-1 IN SERIES WITH I REAR 11 (OPEN) | | 1 | | C-2 IS CLOSED THEN OPENED CAUSING SOLENOID TO CLOSE & THEN OPEN AND STEP TO NEXT POSITION | 1 | ALLOWS DC TO BE PLACED ON LOADER ARM MOTOR THRU I REAR 11. |
| D | 1 | OPEN CIRCUIT SINCE D-1 IN SERIES WITH I REAR 12 AND 2 (OPEN) | | 1 | | | 1 | |
| E | 1 | OPEN CIRCUIT SINCE E-1 IN SERIES WITH 1 FRONT 6-7-8, 1 REAR 3-5 (OPEN) | | 1 | | | 1 | |
| F | OPEN | | | OPEN | | | OPEN | |
| G | OPEN | | | OPEN | | | OPEN | |
| P | CLOSED | NO FUNCTION SINCE F-G II FRONT 9 OPEN | | CLOSED | | | CLOSED | |
| H | OPEN | | | OPEN | | | OPEN | |
| PRELIMINARY SWITCHES B | 1 | SEE II REAR 1 | | 1 | | RECORD STACK HAS LOST HEIGHT 2 THUS CLOSING B-2 TO OPERATE ELEVATOR | 2 | |
| MAIN OFF-ON SWITCH J | CLOSED | MACHINE ON | | | | | | |
| SOLD-OUT SWITCH K | CLOSED | MACHINE ON | | | | | | |
| 1 | 2 | 3 | 4 | 5 | 6 | 7 | 8 | 9 |

FIG. 38A

INVENTOR.
ROBERT M. CAIN
BY Ostrolenk + Faber
ATTORNEYS

| SWITCHES | RECORD ARM CONTROL MOTOR COMPLETES PLACEMENT OF RECORDING ARM | CUT RECORD | | 1 MIN. 45 SEC. AFTER CUT STARTS | FINISH OF RECORDING | RECORDING ARM REMOVAL | |
|---|---|---|---|---|---|---|---|
| | | CONTACTS ENGAGED | FUNCTION | | | CONTACTS ENGAGED | FUNCTION |
| STEPPING SWITCH 1 FRONT | | | | | | | |
| 1 REAR | | 12 | PUTS DC ON RECORD ARM PLACING MOTOR THRU D-1 | | | | |
| 2 FRONT | | | | | | | |
| 2 REAR | | 1 (4 IS NOW OPEN) | ARM REMAINS BY CONTACT 1, BUT 4 OPENS TO STOP ELEVATOR WHILE RECORDING IS IN PROGRESS | | | 1 AND 4 | CIRCUIT TO ELEVATOR THRU B-2 AGAIN CLOSED. AMP. REMAINS ON. |
| 3 REAR | | 4 | ENERGIZES TURNTABLE MOTOR | | | 5 | ENERGIZES CUTTER ARM CONTROL MOTOR TO REMOVE CUTTING ARM & RESTORE IT TO AT REST POSITION. |
| 4 FRONT | | 9 | PREPARES CIRCUIT TO F, G AND H | | | | |
| 4 REAR | | 4 | LIGHTS #4 SIGNAL PANEL "TALK OR SING INTO TELEPHONE." | | | | |
| A | | OPEN | | | | OPEN | |
| C | | 1 | DC NO LONGER ON LOADER MOTOR SINCE I REAR 11 NOW OPEN. | | | 1 | |
| D | D-2 IS CLOSED THEN OPENED CAUSING SOLENOID TO CLOSE THEN OPEN & STEP TO NEXT POSITION | 1 | ALLOWS DC TO BE PLACED ON RECORDING ARM PLACING MOTOR THRU I REAR 12 | | | 1 | DC NO LONGER ON REC. ARM PLACING MOTOR SINCE I REAR 18 NOW OPEN. |
| E | | 1 | | | | 1 | |
| F | | OPEN | | | F CLOSES ENERGIZING SOLENOID. IS IN SERIES P. OPENS WITH CLOSE OF SOLENOID, OPENING CIRCUIT TO STEP TO NEXT FUNCTION | CLOSED THEN OPENED | F REMAINS CLOSED TIL ARM IS MECH. RETRACED FROM SWITCH. THEN SWITCH OPENS. (NO FUNCTION SINCE IN SERIES WITH II FRONT 9-OPEN |
| G | | OPEN | | | | OPEN | |
| P | | CLOSED | | | TWO P OPENS & CLOSES WITH EACH STROKE OF SOLENOID, P IS ONLY IN CIRCUIT UNDER CERTAIN CONDITIONS. SELF STEPS. | CLOSED | NO FUNCTION SINCE G AND II FRONT AND IV FRONT OPEN |
| H | | OPEN | | H IS CLOSED TO LIGHT SIGNAL PANEL 5, "YOU HAVE 15 SECONDS TO COMPLETE RECORD" | CLOSED SAME | CLOSED THEN OPEN | |
| PRELIMINARY SWITCHES B | | 2 | ELEVATOR CEASES TO OPERATE DUE TO II REAR 4 BEING OPEN. | | | 2 | ELEVATOR RUNS TO RESTORE PROPER HEIGHT. |
| MAIN OFF-ON SWITCH J | | | | | | | |
| SOLD-OUT SWITCH K | | | | | | | |
| 1 | 10 | 11 | 12 | 13 | 14 | 15 | 16 |

FIG. 38B

INVENTOR.
ROBERT M. CAIN
BY Ostrolenk & Faber
ATTORNEYS

| SWITCHES | COMPLETION OF RECORDING ARM REMOVAL | PHONO ARM PLACEMENT | | COMPLETED PHONO ARM PLACEMENT | PLAY RECORD | |
|---|---|---|---|---|---|---|
| | | CONTACTS ENGAGED | FUNCTION | | CONTACTS ENGAGED | FUNCTION |
| STEPPING SWITCH 1 FRONT | | | | | | |
| 1 REAR | | 2 | PUTS DC ON RECORDING ARM, PLACING MOTOR THRU D-1 | | 3 | PUTS DC ON PHONO ARM CONTROL MOTOR THRU E-1 |
| 2 FRONT | | | | | | |
| 2 REAR | | 1 AND 4 | | | 1 AND 4 | |
| 3 REAR | | 6 | ENERGIZES PHONO ARM PLACEMENT MOTOR TO POSITION PHONO ARM OVER EDGE OF RECORD | | 7 | ENERGIZES TURNTABLE MOTOR |
| 4 FRONT | | | | | 12 | PREPARES CIRCUIT TO F-G-H |
| 4 REAR | | 6 | LIGHTS #6 SIGNAL PANEL, "WILL NOW PLAY YOUR RECORD, THEN DELIVER IT TO YOU." | | 7 | LIGHTS #7 SIGNAL PANEL "FOR PRIVATE LISTENING, USE PHONE-FOR LOUD SPEAKER-HANG PHONE ON CRADLE." |
| A | | OPEN | | | OPEN | |
| C | | 1 | | | 1 | |
| D | D-2 CLOSES THEN OPENS 2 TO STEP SOLENOID AND SWITCH TO NEXT FUNCTION. | 1 | ALLOWS DC TO BE PLACED ON RECORDING ARM PLACING MOTOR THRU I REAR 2 | | 1 | DC NO LONGER ON REC. ARM PLACING MOTOR SINCE I REAR 2 NOW OPEN. |
| E | | 1 | | E CLOSES THEN OPENS TO ENERGIZE, THEN DE-ENERGIZE 2 SOLENOID TO STEP TO NEXT POSITION | 1 | ALLOWS DC TO BE PLACED ON PHONO ARM CONTROL MOTOR THRU I REAR 3 |
| F | | OPEN | | | OPEN | |
| G | | OPEN | | | OPEN | |
| P | | CLOSED | | | CLOSED | |
| H | | OPEN | | | OPEN | |
| PRELIMINARY SWITCHES B | | 2 | | | 1 | ELEVATOR HAS CLIMBED HIGH ENOUGH TO OPEN B-2, THIS IS NOT NECESSARILY AT EXACTLY THIS TIME, BUT IS ONLY APPROX.. |
| MAIN OFF-ON SWITCH J | | | | | | |
| SOLD-OUT SWITCH K | | | | | | |
| 1 | 17 | 18 | 19 | 20 | 21 | 22 |

FIG. 38C

INVENTOR.
ROBERT M. CAIN
BY Ostrolenk + Faber
ATTORNEYS

AUTOMATIC VOICE RECORDER

Filed March 16, 1949 22 Sheets-Sheet 20

| SWITCHES | COMPLETE PLAYBACK OF RECORD | PHONO ARM REMOVAL | | COMPLETES REMOVAL OF PHONO ARM | I SELF STEP | |
|---|---|---|---|---|---|---|
| | | CONTACTS ENGAGED | FUNCTION | | CONTACTS ENGAGED | FUNCTION |
| STEPPING SWITCH 1 FRONT | | | | | | |
| 1 REAR | | | | | 5 | PUTS DC ON PHONO ARM CONTROL MOTOR THRU E-1 |
| 2 FRONT | | | | | 9 | PREPARES SWITCH P FOR SELF STEPPING AND ENERGIZE SOLENOID. |
| 2 REAR | | 1 AND 4 | | | 1 AND 4 | |
| 3 REAR | | 8 | ENERGIZES PHONO ARM PLACEMENT MOTOR TO REMOVE PHONE ARM FROM TURN-TABLE | | | |
| 4 FRONT | | | | | | |
| 4 REAR | | 8 | ENERGIZES TURNTABLE MOTOR SO RECORD EJECTOR WILL FUNCT-ION TO REMOVE RECORD FROM TURNTABLE | | | |
| A | | OPEN | | | OPEN | |
| C | | 1 | | | 1 | |
| D | | 1 | | | 1 | |
| E | | 1 | DC NO LONGER ON PHONO ARM CONTROL MOTOR SINCE I REAR 3 NOW OPEN | E-2 CLOSES THEN OPENS TO ENERGIZE THEN DE-ENERGIZE SOLENOID TO STEP TO NEXT FUNCT-ION. | 1 | ALLOWS DC TO BE PLACED ON PHONO ARM CONTROL MOTOR THRU I REAR 5 |
| F | | OPEN | | | OPEN | |
| G | G CLOSES ENERGIZING SOLENOID, P OPENS WITH CLOSE OF SOLENOID THUS OPENING CIRCUIT TO STEP TO NEXT FUNCTION | CLOSED THEN OPENED | G REMAINS CLOSED TIL ARM IS MECH. RETRACED FROM SWITCH. SWITCH THEN OPENS (NO FUNCTION SINCE IN SERIES WITH IV FRONT 12 - NOW OPEN | | OPEN | |
| P | THO P OPENS & CLOSES WITH EACH STROKE OF SOLENOID, P IS ONLY IN CIR-CUIT UNDER CERTAIN CONDIT-IONS. SELF STEPS NOW | CLOSED | NO FUNCTION SINCE II FRONT AND IV FRONT OPEN | | CLOSED | P OPENS WITH CLOSING OF SOLENOID THUS BREAK-ING ENERGIZING CIRCUIT THUS CAUSING STITCH TO STEP TO NEXT FUNCTION. |
| H | | OPEN | | | OPEN | |
| PRELIMINARY SWITCHES B | | 1 | | | 1 | |
| MAIN OFF-ON SWITCH J | | | | | | |
| SOLD-OUT SWITCH K | | | | | | |
| 1 | 23 | 24 | 25 | 26 | 27 | 28 |

FIG. 38D

INVENTOR.
ROBERT M. CAIN
BY Ostrolenk & Faber
ATTORNEYS

| SWITCHES | II SELF STEP | | III SELF STEP | | IV SELF STEP | |
|---|---|---|---|---|---|---|
| | CONTACTS ENGAGED | FUNCTION | CONTACTS ENGAGED | FUNCTION | CONTACTS ENGAGED | FUNCTION |
| STEPPING SWITCH 1 FRONT | 6 | PUTS DC ON PHONO ARM CONTROL MOTOR THRU E-1. | 7 | PUTS DC ON PHONO ARM CONTROL MOTOR THRU E-1. | 8 | PUTS DC ON PHONO ARM CONTROL MOTOR THRU E-1. |
| 1 REAR | | | | | | |
| 2 FRONT | 9 | PREPARES SWITCH P FOR SELF STEPPING AND ENERGIZES SOLENOID. | 9 | PREPARES SWITCH P FOR SELF STEPPING AND ENERGIZES SOLENOID. | 9 | PREPARES SWITCH P FOR SELF STEPPING AND ENERGIZES SOLENOID. |
| 2 REAR | 1 AND 4. | | 1 AND 4 | | 1 AND 4 | |
| 3 REAR | | | | | | |
| 4 FRONT | | | | | | |
| 4 REAR | 10 | ENERGIZES COUNTER TO RING UP 1 SALE OR PLAY. | | | | |
| A | OPEN | | OPEN | | OPEN | |
| C | 1 | | 1 | | 1 | |
| D | 1 | | 1 | | 1 | |
| E | 1 | ALLOWS DC TO BE PLACED ON PHONO ARM CONTROL MOTOR THRU I FRONT 6. | 1 | ALLOWS DC TO BE PLACED ON PHONO ARM CONTROL MOTOR THRU I FRONT 7. | 1 | ALLOWS DC TO BE PLACED ON PHONO ARM CONTROL MOTOR THRU I FRONT 8. |
| F | OPEN | | OPEN | | OPEN | |
| G | OPEN | | OPEN | | OPEN | |
| P | CLOSED | P OPENS WITH CLOSING OF SOLENOID THUS BREAKING ENERGIZING CIRCUIT THUS CAUSING SWITCH TO STEP TO NEXT FUNCTION. | CLOSED | P OPENS WITH CLOSING OF SOLENOID THUS BREAKING ENERGIZING CIRCUIT THUS CAUSING SWITCH TO STEP TO NEXT FUNCTION. | CLOSED | P OPENS WITH CLOSING OF SOLENOID THUS BREAKING ENERGIZING CIRCUIT THUS CAUSING SWITCH TO STEP TO NEXT FUNCTION. |
| H | OPEN | | OPEN | | OPEN | |
| PRELIMINARY SWITCHES B | | | 1 | | 1 | |
| MAIN OFF - ON SWITCH J | | | | | | |
| SOLD - OUT SWITCH K | | | | | | |
| 1 | 29 | 30 | 31 | 32 | 33 | 34 |

FIG. 38E

INVENTOR.
ROBERT M. CAIN
BY Ostrolenk & Faber
ATTORNEYS

Oct. 21, 1952 R. M. CAIN 2,614,846

AUTOMATIC VOICE RECORDER

Filed March 16, 1949 22 Sheets-Sheet 22

| SWITCHES | IDLE | | SOLD OUT | |
|---|---|---|---|---|
| | CONTACTS ENGAGED | SAME AS COLUMN THREE FUNCTION | (NO RECORD IN ELEVATOR) CONTACTS ENGAGED | FUNCTION |
| STEPPING SWITCH 1 FRONT | | | | |
| 1 REAR | | | | |
| 2 FRONT | | | | |
| 2 REAR | 4 | NOTE, AMPLIFIER IS NOW OFF. ELEVATOR MAY STILL OPERATE DEPENDING ON B-2. | 4 | NORMALLY PREPARING ELEVATOR SWITCH B-2. |
| 3 REAR | 1 | SLUG REJECTOR IS AGAIN PREPARED. | 1 | |
| 4 FRONT | | | | |
| 4 REAR | 1 | #1 LIGHT AGAIN LIT. | 1 | LIGHT OUT SINCE MAIN CIRCUIT BROKEN. |
| A | OPEN | | OPEN | |
| C | 1 | | 1 | |
| D | 1 | | 1 | |
| E | 1 | | 1 | |
| F | OPEN | | OPEN | |
| G | OPEN | | OPEN | |
| P | CLOSED | | CLOSED | |
| H | OPEN | | OPEN | |
| PRELIMINARY SWITCHES B | 1 | | 2 | THIS WOULD NORMALLY CAUSE ELEVATOR TO RUN. |
| MAIN OFF-ON SWITCH J | | | CLOSED | |
| SOLD-OUT SWITCH K | | | OPEN | BREAKS MAIN CIRCUIT TO ENTIRE MACHINE. |
| 1 | 35 | 36 | 37 | 38 |

FIG. 38E

INVENTOR.
ROBERT M. CAIN
BY Ostrolenk & Faber
ATTORNEYS

Patented Oct. 21, 1952 2,614,846

UNITED STATES PATENT OFFICE 2,614,846

AUTOMATIC VOICE RECORDER

Robert M. Cain, Charlotte, Mich., assignor to Wilcox-Gay Corporation, Charlotte, Mich., a corporation of New York Application March 16, 1949, Serial No. 81,751

35 Claims. (Cl. 274—10)

The present invention is an improvement of the automatic sound recorder, play-back and record delivery unit as shown in applications Serial Nos. 783,725, now abandoned, and 783,668 filed November 3, 1947.

This invention relates primarily to improvements in the operating mechanism for the individual elements, improved record loading means and improved electrical control elements.

The device is of a character adapted to be operated by the insertion of a coin and so arranged that it will automatically make the record, play the record back and then deliver the record without any further operations of any kind on the part of the user.

In application Serial No. 627,061 filed November 6, 1945, now Patent No. 2,584,257, and assigned to the assignee of the present invention, there is disclosed novel automatic means for moving a record cutting arm to the proper position on a record disc for initiating recording. This means is also operable on the termination of a recording to return the cutting arm back to the original position where it no longer extends above the record. This means also operates in conjunction with automatic means for starting the turntable and stopping the turntable.

In the aforesaid application, there is also disclosed that this automatic means is applicable as well to the operation of a play-back arm, being adapted automatically to place the play-back arm in the proper position for playing the record and to remove the play-back arm from above the record at the termination of the recording.

The present automatic coin operated recorder and play-back device utilizes the basic principle above described of the automatic means for placing the record cutting arm in position and starting the turntable and for removing the cutting arm from above the record at the termination of the recording.

This novel means is also applied equally to the subsequent placement of the playing arm on the record and also removes the play-back arm from above the record at the termination of the play-back.

This same type of novel automatic arm moving mechanism has also been applied to the arm hereinafter described which is utilized to take a blank record from a stack and place it on a turntable for recording purposes.

The present invention contemplates a number of specific principal functions which must be performed by the novel device in order to produce a commercially practical result and a number of subsidiary functions which are necessary in order that the principal or primary functions operate properly:

1. A coin is dropped into a slot to close an appropriate circuit and initiate all of the following operations.

2. The record placing arm picks up a record from the top of a stack of records and brings the record over to a position above the turntable.

3. The record placing arm is then lowered until the record is on the turntable, whereupon the record placing arm is disengaged from the record.

4. The record placing arm returns to its original position above the stack of records.

5. The cutting arm which is at first located outside the periphery of the turntable is now lifted up and swung in towards the turntable to a position above and slightly inward of the outer edge of the record on the turntable.

6. The cutting arm is lowered so that the cutting stylus engages the record and the turntable is simultaneously caused to move. At the same time the cutting arm, when it is lowered, is engaged with feed means for moving the cutting arm slowly inwardly towards the center of the turntable in order to obtain a spiral cut.

7. At about the time the record is placed on the turntable (step 3 above) and before the stylus of the cutting arm engages the record on the turntable (step 6 above), the user picks up the microphone in order to be ready to start talking or singing into the microphone when the cutting stylus engages the record. As a practical matter, the user may even pick up the microphone before dropping the coin in the box, but the microphone should be picked up by this time at the latest.

8. As the record is cut, the user speaks or sings into the microphone while watching the cutting arm and stylus traverse the record.

9. The user is provided with a signal a short time before the completion of the record in order to warn him that the record is about to end.

10. At the completion of the record, the cutting arm is lifted up from above the turntable and rotated out beyond the periphery of the turntable.

11. The pick up arm which is located on the other side of the turntable from the cutting arm is now lifted up and brought over to a position where the pick up stylus is just above and slightly inward of the outer periphery of the record on the turntable.

12. The pick-up arm is then lowered into engagement with the record on the turntable and the record is played back.

13. After the recording operation is completed, and while the play-back operation is being performed, the user replaces the microphone on its hook.

14. At the completion of the play-back operation, the pick-up arm is lifted up once more above the record on the turntable and rotated outwardly beyond the periphery of the turntable.

15. Upon completion of the play-back operation and as the pick-up arm moves back from above the turntable, a finger is moved in under one side of the record to lift up that side of the record.

16. Since the turntable is still rotating, the other side of the record opposite the finger is moved towards the front of the machine and around to the front of the finger by the motion of the turntable.

17. The above motion may be sufficient to deliver the record to the withdrawal slot where it may be obtained, but in the event it is not so delivered, the finger on its return movement pushes the record out.

18. The record is withdrawn from the withdrawal or delivery slot and the operation is completed.

There are a number of subsidiary operations which are, of course, performed in conjunction with the main operations or to make the main operations possible.

Thus, (*a*) the record stack is so arranged that the records in the stack will be fed upwardly automatically so that the record at the top of the stack will always be in a position to be engaged by the record placing arm.

(*b*) The amplifier is turned on by relay means at the time the coin is dropped. The cutter is always connected to the cutter circuit and the playback is always connected to the play-back circuit. Each circuit is independent, and for the entire operation, the cutter and play-back circuits are "on." Since the cutter cannot cut without being engaged with the record and the play-back does not operate unless it is engaged, no actual switching is required.

(*c*) The play-back arm actuating means serves on the return stroke to actuate the record delivery means which includes the finger above set forth.

(*d*) A series of signals in the form of lights or sounds may be provided to guide the user as to what he should do at any particular time and to inform the user as to what is being done by the machine at any particular time.

Actually all of the above primary and subsidiary functions are directed to the performance of the following main functions on the dropping of a coin in a slot:

I. Automatically to make a recording.

II. Automatically top lay back the record.

III. Automatically to deliver the record.

The primary object of this invention, therefore, is the provision of novel mechanism and means for automatically making, playing back, and delivering records.

As a corollary object of the invention, the foregoing functions are to be performed automatically on the insertion of a coin in a slot or by other simple actuation of the mechanism in which the operator or user need merely drop a coin or press a button, close a switch or perform some similar simple single function to set in motion the whole train of events which results in the making, playing back and delivering of a record.

Other and more specific objects of the invention include novel mechanism and means for placing records on a turntable, removing records from a turntable, placing and removing a cutting arm with respect to a record on a turntable, placing and removing a pick-up arm with respect to a record on a turntable and various automatically operated switching devices which cause all of the foregoing operations to occur in proper predetermined sequence.

Still more specific objects include a novel record lifting construction comprising novel record engaging elements and a positive release for the record engaging elements; a novel clutch type operating mechanism for placing the cutting arm and play-back arm in position at the beginning of a record and for removing them from the record after the completion of their operation; a similar operating mechanism for the record loading arm; a novel mounting for the base plate of the mechanism; and novel electrical sequentially operable elements.

The foregoing and many other objects of the invention will become apparent in the following description and drawings in which.

Figure 18:
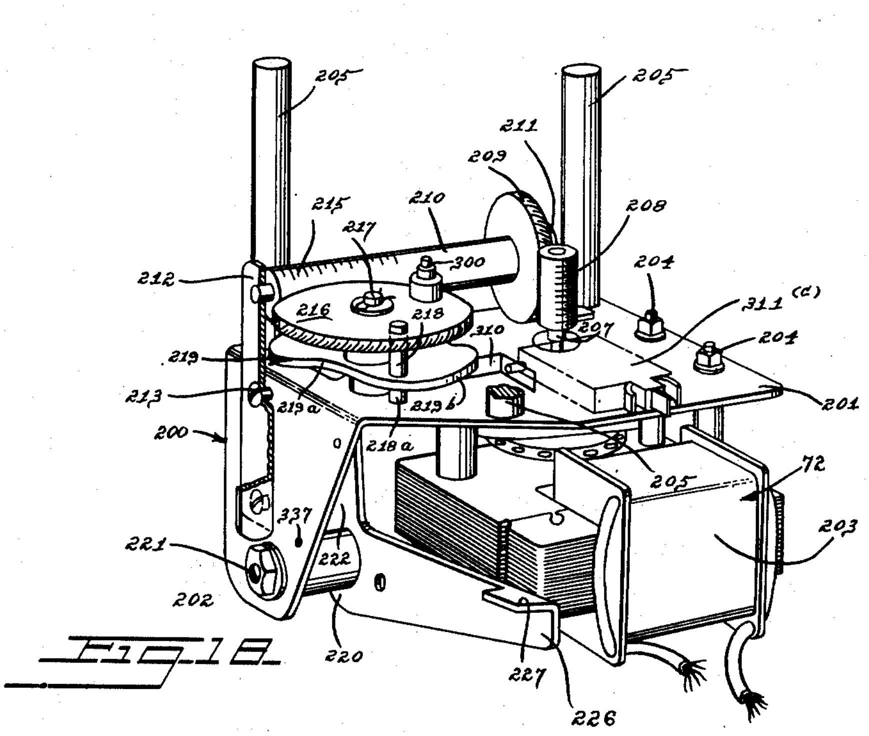
Figures 16, 17:
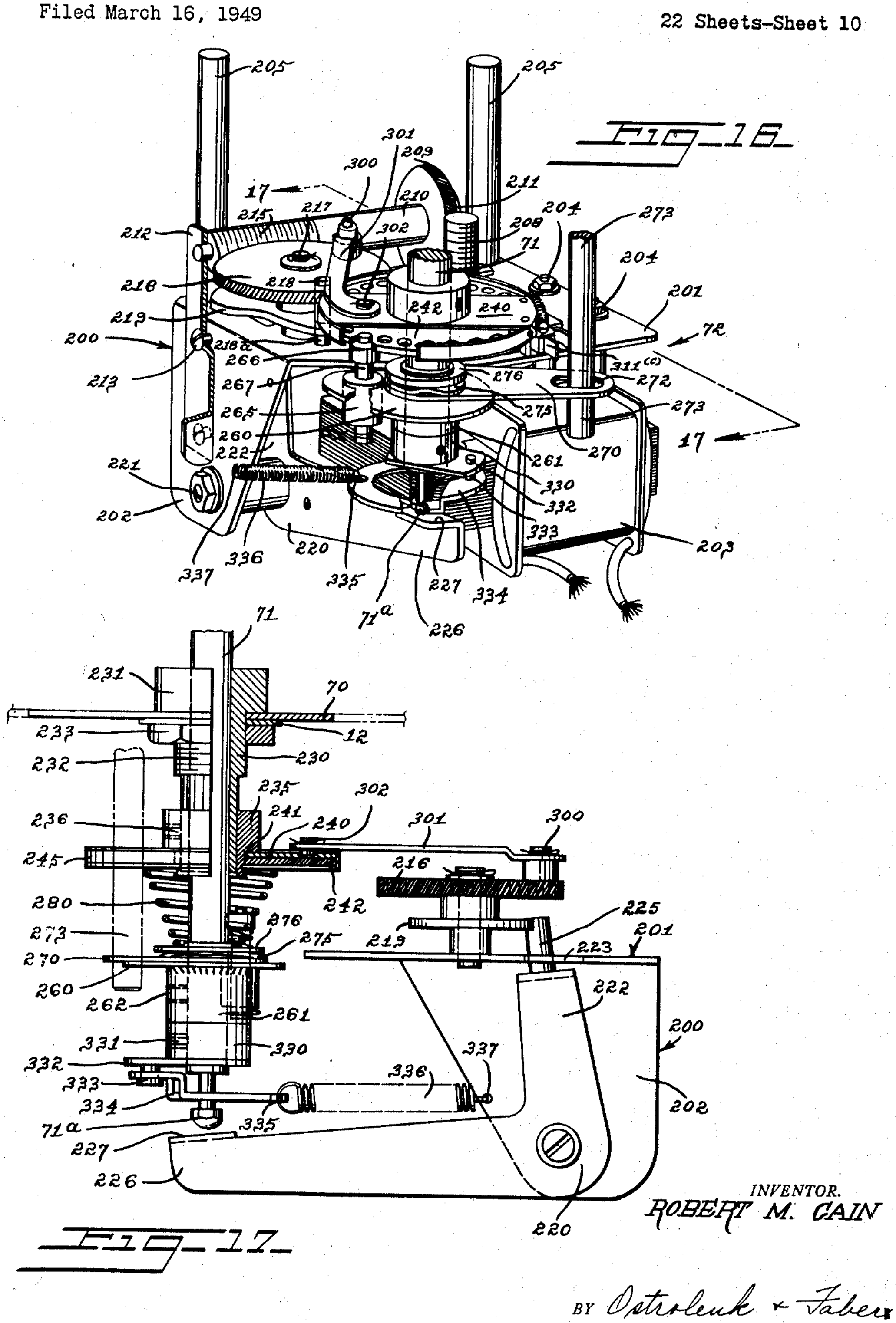
Figure 16 is a view in perspective of the drive mechanism for the record loading arm. This drive mechanism is identical for the loading arm, cutter arm and play-back arm.
Figure 17 is a side view taken from line 17—17 of Figure 16 of the loading arm drive mechanism with the motor omitted.

Figure 18 is a view in perspective of the drive mechanism for the record loading arm corresponding to the view of Figure 16 but with portions of the elements removed to clarify the operation of the cam.

Figures 19, 20:
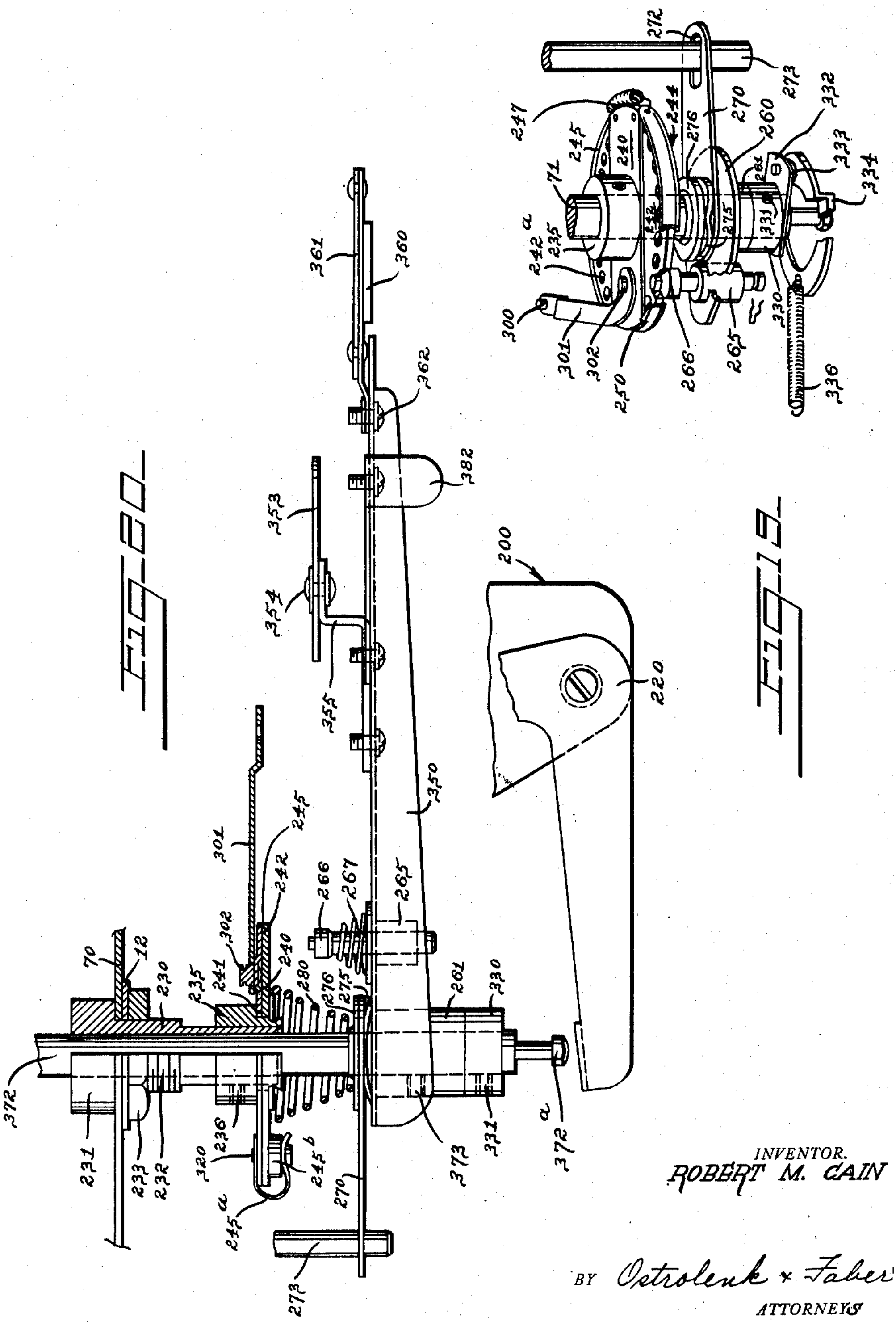

Figure 19 is a side view in perspective of pivot shafts and clutch assembly sections of the operating mechanism of Figure 16.

Figure 20 is a fragmentary side view showing the application of the operating mechanism of Figure 16 to the cutter arm.

Figure 21:
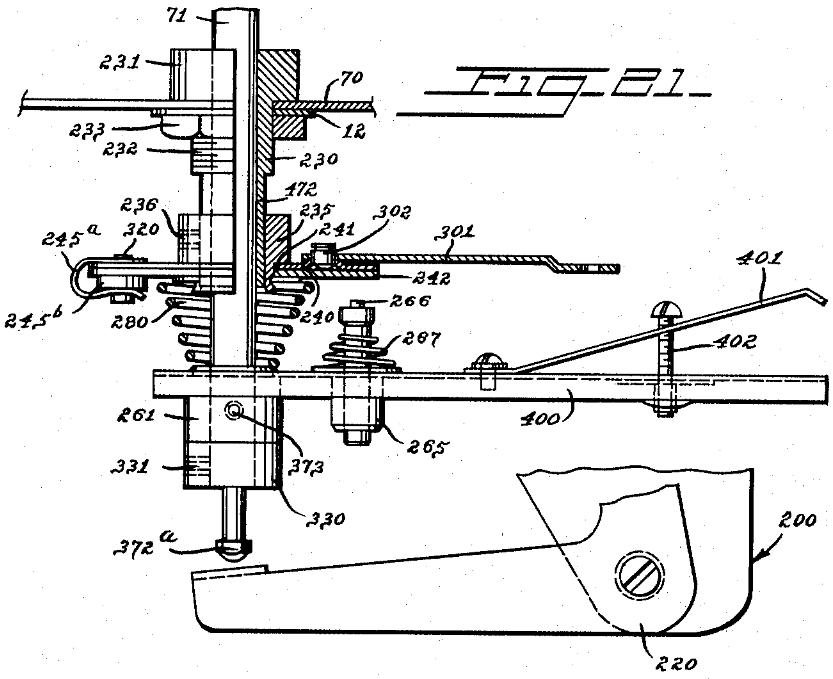

Figure 21 is a fragmentary side view showing the application of the operating mechanism of Figure 16 to the play-back arm.

Figure 22:
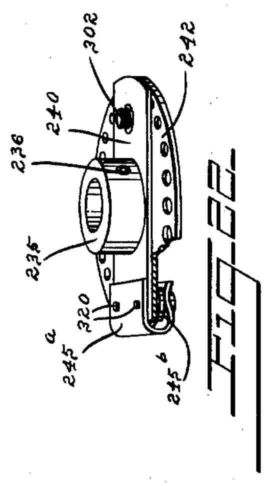

Figure 22 is a view in perspective showing a modified and preferred form of the clutch disc assembly of the operating mechanism of Figure 16.

Figure 23:
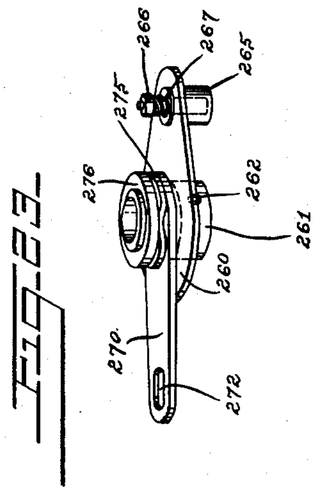

Figure 23 is a view in perspective showing the drive plate and stabilizer assembly of the operating mechanism of Figures 16 and 19.

Figure 24:
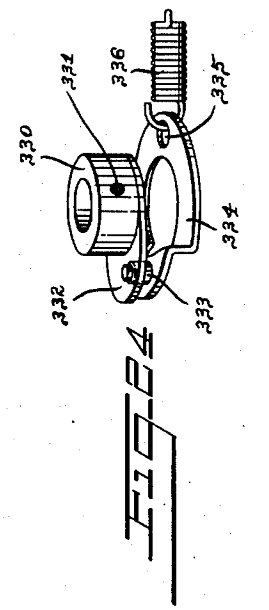

Figure 24 is a view in perspective showing the toggle arm assembly of the operating mechanism of Figures 16 and 19.

Figure 2:
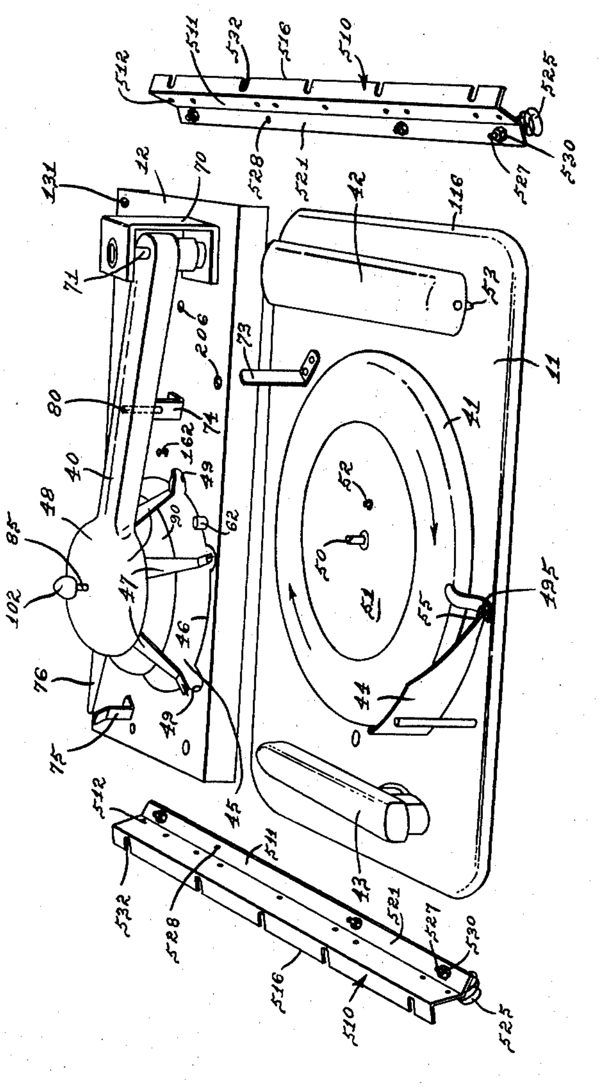
Figure 2 is a top view partly expanded of the operating elements of the novel automatic recorder and play-back device.
Figure 3:
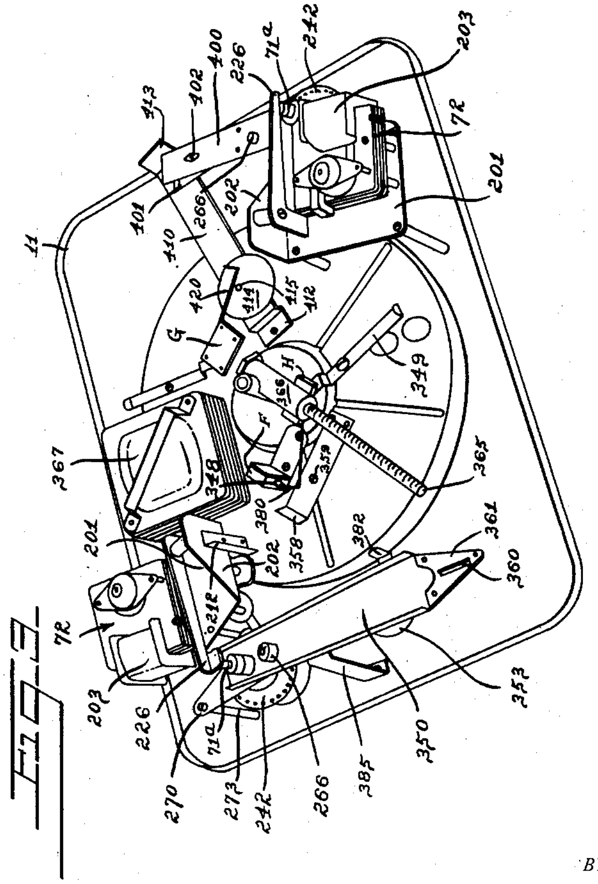
Figure 3 is a bottom view of a portion of the operating elements of the novel automatic recorder and play-back device.
Figure 25:
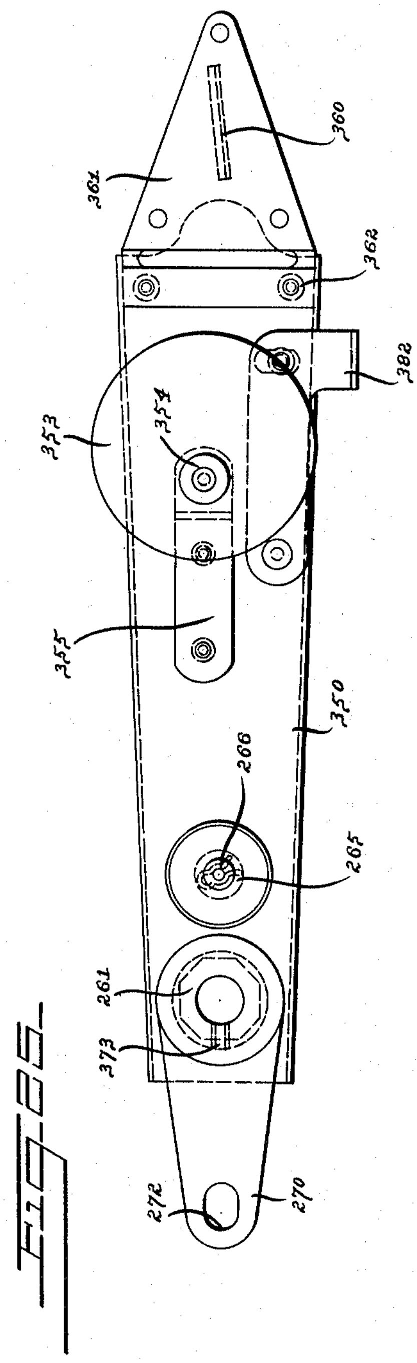

Figure 25 is a top view of the follower arm feed assembly for the cutting arm of Figures 2, 3, and 20.

Figure 26:
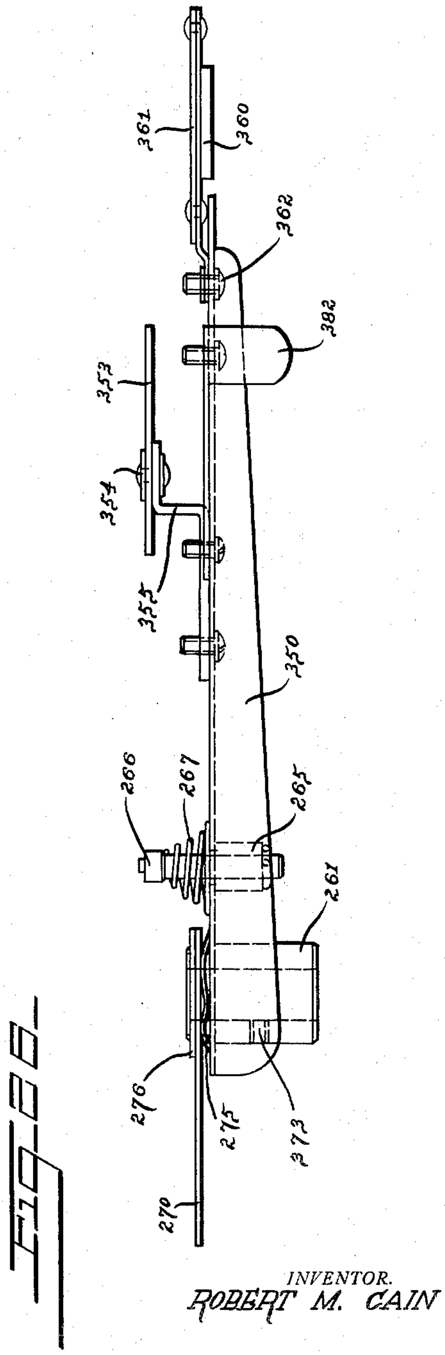

Figure 26 is a side view of the arm of Figure 25.

Figure 27:
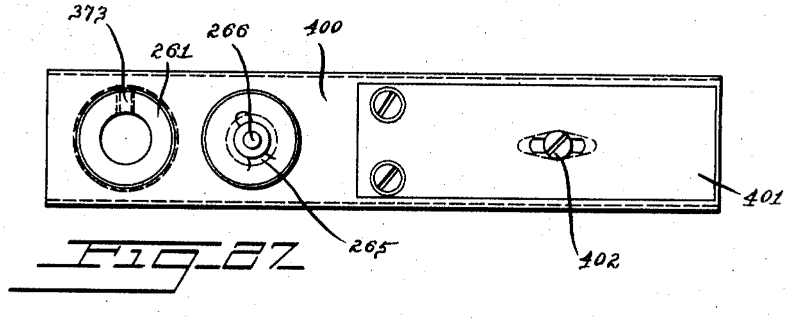

Figure 27 is a top view of the play-back drive plate for the play-back arm of Figures 2, 3 and 21.

Figure 28:
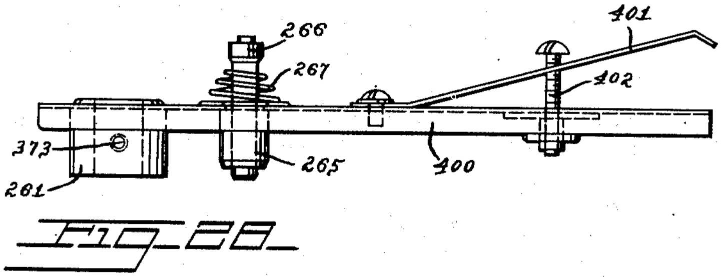

Figure 28 is a side view of the plate of Figure 27.

Figure 29:
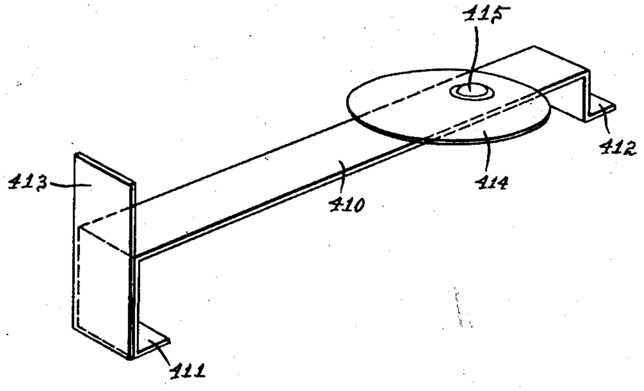

Figure 29 is a view in perspective of the play-back index bracket assembly for the play-back arm of Figures 2, 3 and 21.

Figure 30:
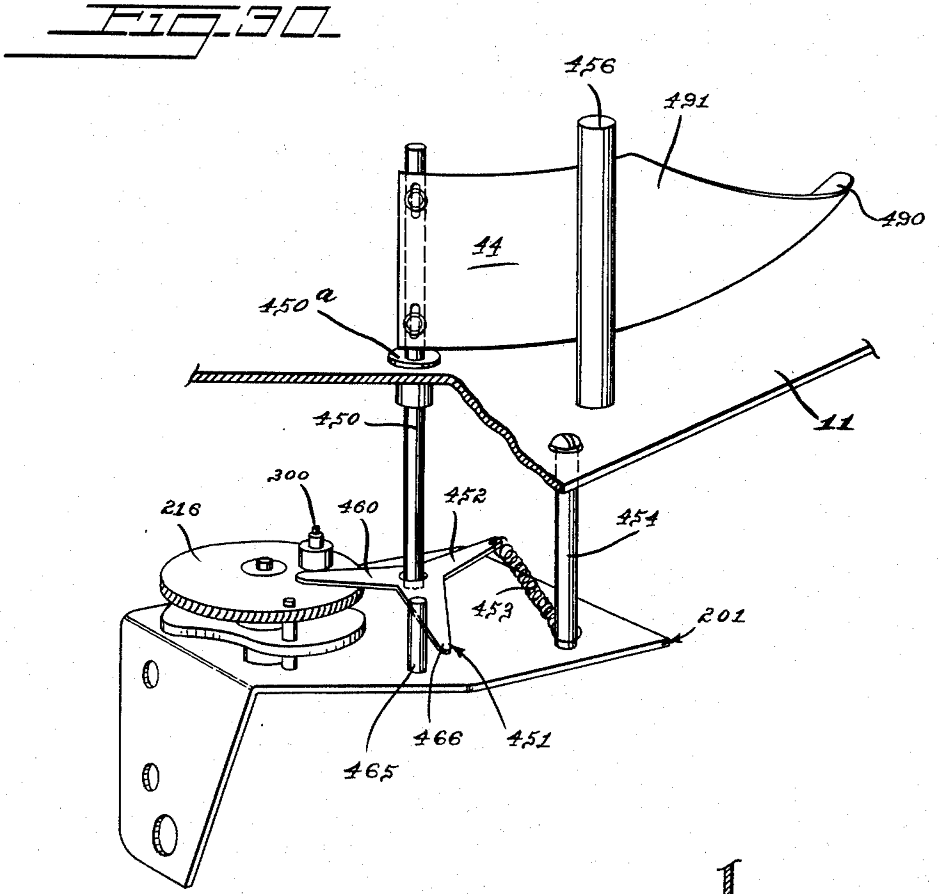

Figure 30 is a fragmentary view in perspective of the record delivery or ejector arm and its actuating mechanism.

Figure 31:
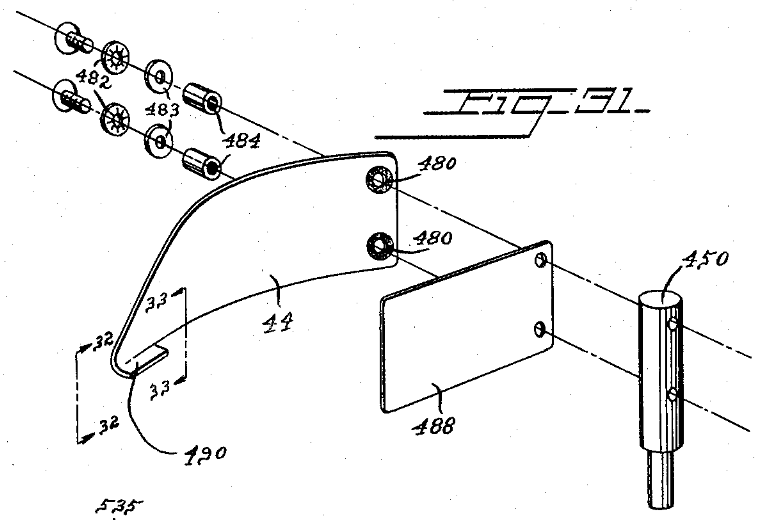

Figure 31 is a view in perspective of the side of the record delivery arm opposite to that of Figure 30.

Figure 32:
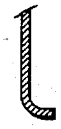

Figure 32 is an end view of the arm of Figure 31 taken from line 32—32 of Figure 31 looking in the direction of the arrows.

Figure 33:
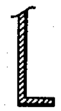

Figure 33 is a view partly in cross-section of the arm of Figure 31 taken on line 33—33 of Figure 31 looking in the direction of the arrows.

Figures 34, 35, 36:
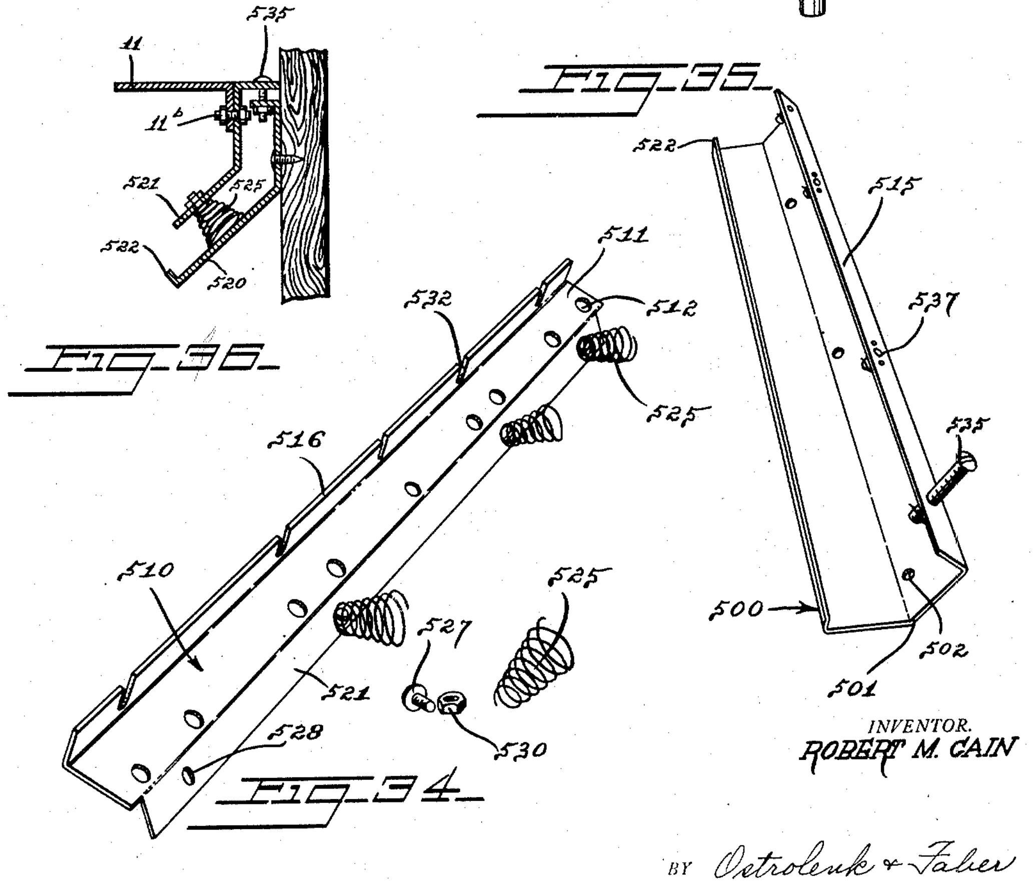

Figures 34 and 35 are views in perspective of the resilient support member for the base plate of Figures 2 and 3.

Figure 36 is an end view partly in cross-section showing the elements of Figures 34 and 35 utilized for supporting the base plate.

Figure 37:
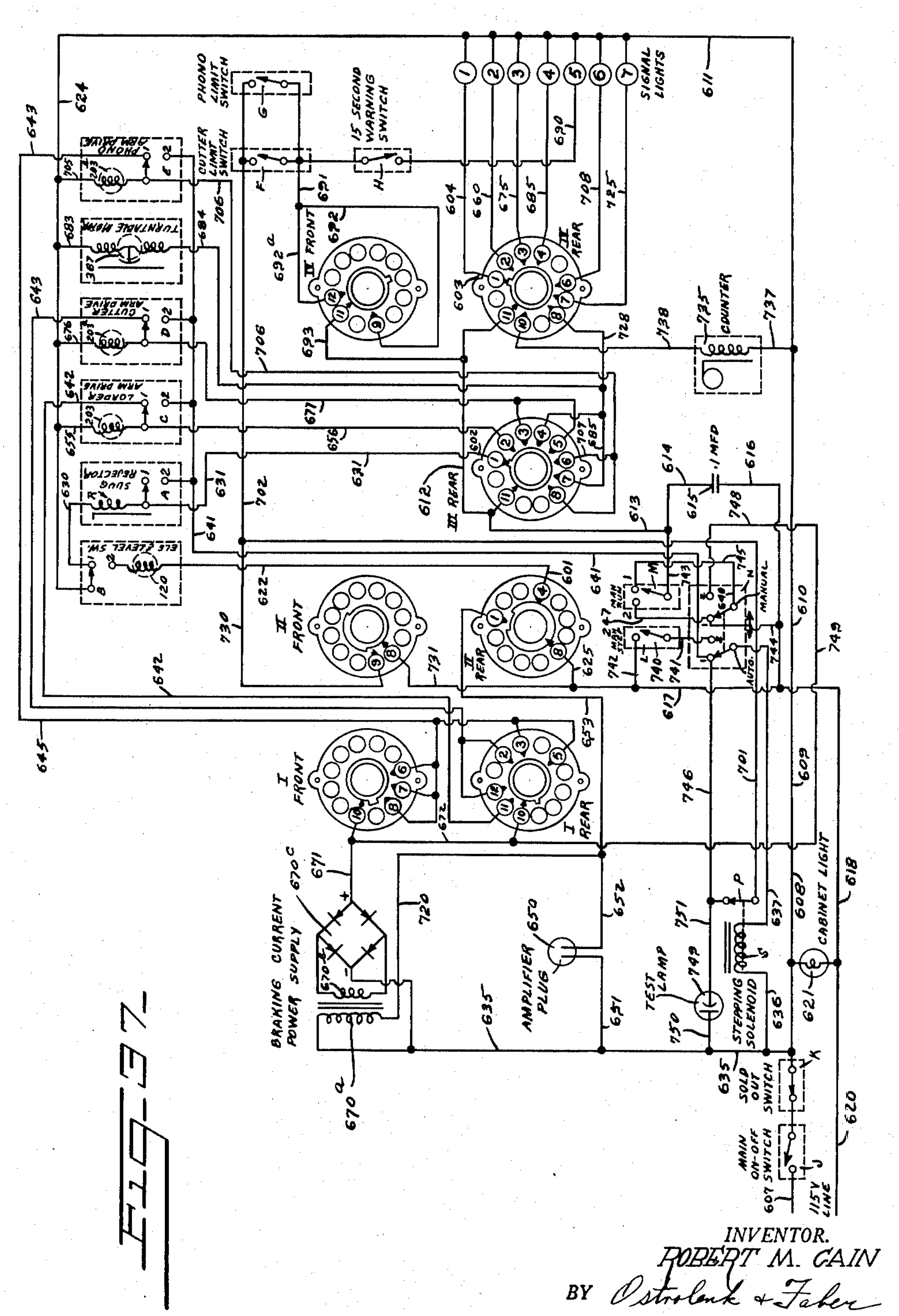

Figure 37 is a circuit diagram showing the operation of the novel automatic recording and play-back mechanism.

Figure 38 (38A, 38B, 38C, 38D, 38E and 38F) is a chart showing the various operations of the novel recorder and play-back mechanism.

Figure 1:
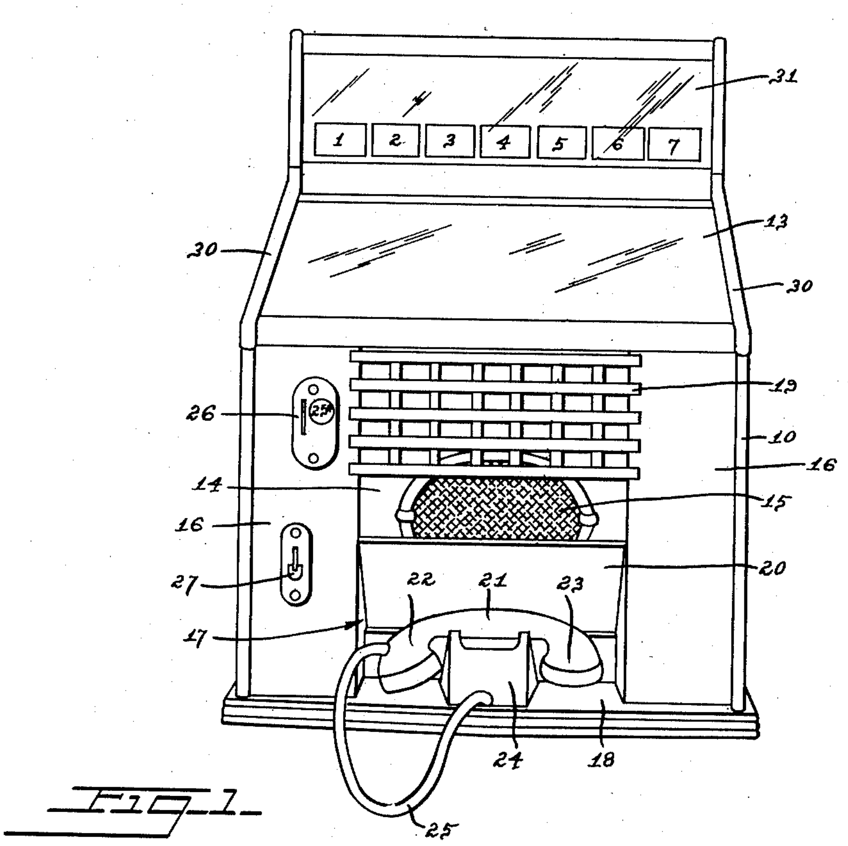
Figure 1 is a front elevation of the improved automatic recorder and play-back device.

Referring first to Figure 1, I have here shown the cabinet 10 housing the novel automatic coin operated disc recording and play-back unit. The base plate 11 for the turntable and the base plate 12 for the record loading arm (Figure 2) are mounted horizontally beneath the glass panel 13 (Figure 1) just above the recessed panel 14 in the front of the cabinet which carries the loud-speaker grill 15. The recessed panel 14 is flanked by the front side panels 16, 16 which define the recess 17 having the bottom wall 18 and the front decorative grill 19. The front edge of the base plate 11 is spaced just above recessed panel 14 so that a gap is provided over the recess 17 through which a record which has been made may be delivered by the apparatus hereinafter described to be dropped on the inclined platform 20 from which it may be manually withdrawn. This type of construction is described generally in application Serial No. 783,725 above referred to. A telephone hand-set 21, comprising the microphone 22 and ear-piece 23 is mounted on the cradle 24 on the bottom wall 18 of recess 17. Cable 25 connects the hand-set 21 to the remainder of the apparatus. Appropriate switch means may be provided on the cradle 24 so that when the hand-set 21 is placed thereon, the loud-speaker is switched into circuit and when the hand-set is lifted, the ear-piece 23 is switched into circuit and the speaker is switched off. This makes it possible for the user to hear the record privately if he desires or to permit others to hear it after it is made by the process hereinafter described.

An appropriate coin chute 26 and coin return 27 may be provided on one of panels 16 to control the initiation of the operation of the machine. The glass panel 13 may be made removable preferably by sliding forward and downward in runners 30 to permit adjustment of the elements on top of plates 11 and 12 and may be locked against tampering in any appropriate manner.

A plurality of signal light panels 1 to 7 may be provided at the top panel 31 at the upper back portion of the cabinet with suitable legends indicating, when successive panels are lit, what operations are being performed by the machine and what operations are to be performed by the user.

Thus, panel 1 may contain a legend indicating that the machine is ready for use or instructing the user to drop a quarter in the slot. Successive panels as they are lit, will tell the user (2) to lift the microphone, (3) to start talking or singing, (4) that he has 15 seconds to go, (5) that recording is over, (6) to listen to the play-back, (7) that his record is being delivered; or other appropriate legends may be used.

The various basic elements of the automatic recorder and play-back unit comprise (Figures 2, 3 and 4) the record loading arm 40, the turntable 41, the record cutting arm 42, the record play-back arm 43 and the record delivery arm 44. The record loading arm 40 and its associated apparatus are mounted on the base plate 12; the record cutting arm 42, the play-back arm 43, the delivery arm 44 and turntable 41 are mounted on the base plate 10.

The function of the apparatus is that on appropriate energization, as by depositing a coin in coin chute 26, the record loading arm 40 will pick up a record from the top of stack 45 of records which will be available through opening 46 in the top of base plate 12; this operation will be performed by lowering arm 40 until the record gripping fingers 47 on the head 48 thereof will pass through recesses 49 at the edge of opening 46 to engage the top record. The loading arm will then rise and rotate toward the turntable 41 until the center hole of the record is over the spindle 50 of the turntable and will then move down toward the turntable until the record 51 moves over the spindle. The fingers 47 are then operated to disengage the record 51 so that it drops down on turntable 41. The loading arm 40 thereafter moves up and then rotates back to the original position shown in Figure 2.

The turntable 41 begins to rotate as the record 51 is dropped thereon. The cutting arm 42 is then lifted from the position shown in Figure 2 and thereafter rotated to a position where the cutting stylus 53 is over the margin of record 51 slightly in from the edge, whereupon the cutting arm moves down to engage the record. Eccentric pin 52 on the turntable moves into registry with and engages the corresponding eccentric hole in the record 51 to ensure that the record moves with the turntable. The cutting arm is driven in toward center slowly, as the turntable rotates, cutting a spiral groove in record 51.

At the completion of the record cutting operation, the cutting arm 42 is raised once more and rotated outwardly back to the position of Figure 2.

The play-back arm 43 is then raised and rotated inwardly toward the center of the turntable until its stylus is over the outer margin of record 51. Play-back arm 43 is then lowered and moves freely inwardly with its stylus tracking in the groove until it reaches the inner end of the spiral cut in record 51. At this time the play-back arm 43 rises once more and is rotated out back to the position of Figure 2.

As the play-back arm 43 moves out, it actuates the record delivery arm 44 to move its lip 55 under the edge of record 51, lifting one side of the record and lifting it off spindles 50 and 52. The other side of the record, in engagement with the turntable, is spun by the turntable around arm 44 to the opposite side of arm 44 as hereinafter described and the movement of arm 44 back to its original position pushes record 51 out and off the base-plate 11.

The basic elements of the device thus consist of (1) the record storage and loading assembly, (2) the operating mechanism for the record loading arm; duplicates of this operating mechanism with but slight variation are utilized in substantially the same form for movement of the cutter arm toward and away from the turntable and for movement of the play-back arm toward and away from the turntable, (3) the record cutting assembly, (4) the play-back assembly, (5) the record delivery assembly, (6) the turntable and base plate assembly, and (7) the electrical and mechanical sequential control elements.

I. *Record storage and loading assembly*

The record storage and loading assembly is supported from the rear base plate 12 (Figures 2 and 4) and comprises the record loading arm 40, the platform 60 for supporting the stack 45 of records 51, the elevator 61 for platform 60, the guide rods 62 for the stack 45 and for elevator 61, supported from base plate 12 and the bracing plate 63.

The entire assembly consists, therefore, of (*a*) the loading arm, (*b*) the stack support and its elevator, and (*c*) the operating mechanism for actuating the loading arm. Since the operating mechanism for actuating the loading arm is substantially duplicated for the cutting arm and play-back arm, it will be separately described.

*Ia. The record loading arm*

Figure 4:
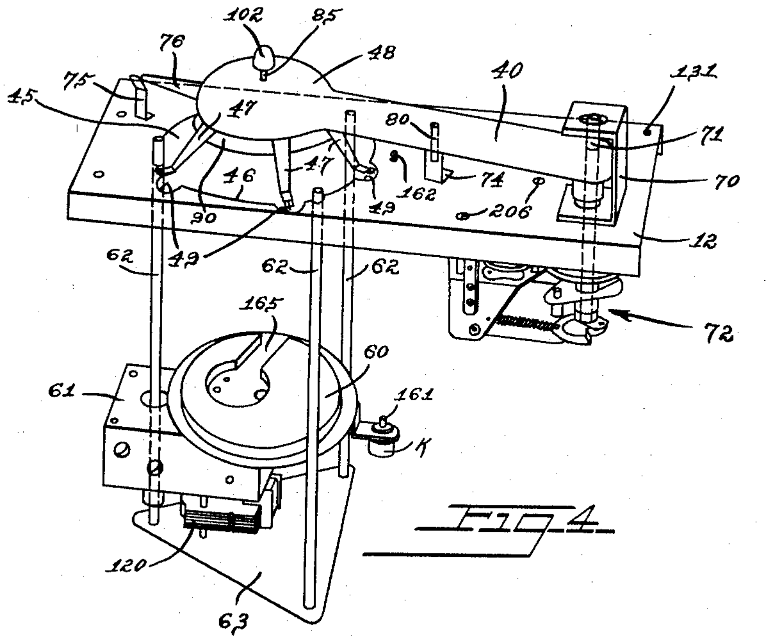
Figure 4 is a top view in perspective of the record storage and loading arm assembly of the novel device.
Figure 6:
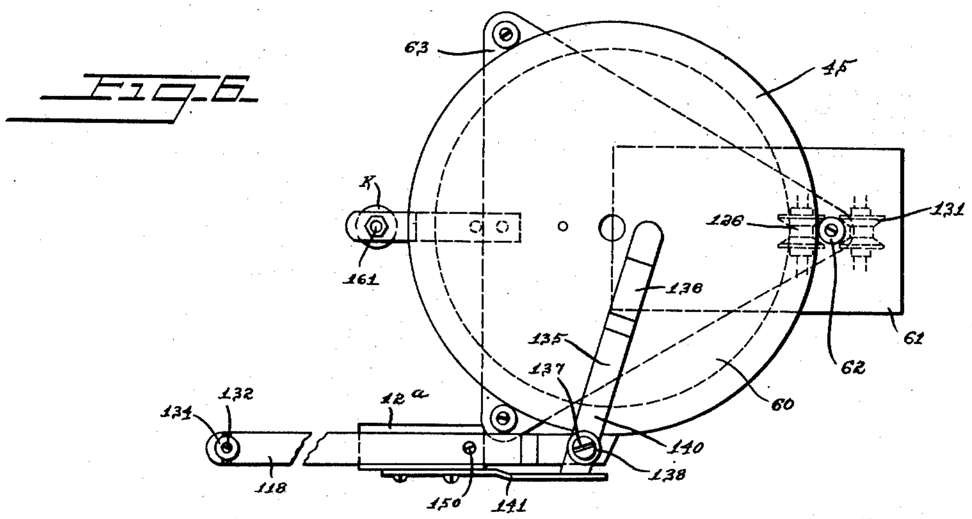
Figure 6 is a top view of the elevator assembly of Figure 5.

The record loading arm 40 is pivotally mounted in bracket 70, mounted on the upper surface of base plate 12. Shaft 71, which is rotatably and slidably journalled in bracket 70, is driven by the operating mechanism 72, hereinafter more specifically described under heading, II. Arm operating mechanism, and in connection with Figures 16 to 19, 22 to 24. For a full understanding of the operation of the loading arm 40, it is sufficient here to point out that it is keyed to shaft 71, that in its normal at rest position it extends, as shown in Figures 2 and 4, so that its head 48 and fingers 47, register with opening 46 in base plate 12 through which the top of record stack 45 is available and that in the at rest position it is raised so that it does not engage the top of the stack. When the operating mechanism 72 is actuated, it first causes shaft 71 and hence arm 40 to move downwardly until the fingers 47 engage the top record in stack 45 through opening 46, the recesses 49 in the edge of opening 46 providing clearance for fingers 47 for this purpose.

The fingers 47 have been spread as hereinafter described to drop the previous record. During the initial downward movement of arm 40 the latch lever 76 extending from the head 48 of arm 40 engages the latch trip 75 to release the fingers 47 from their spread position and restore them to their original record gripping position as hereinafter described.

Shaft 71 and arm 40 are then raised and rotated to a position where the side of arm 40 strikes the stop 73 (Figure 2) at which point the record carried by fingers 47 is in registry with turntable 41 and its spindle 50; shaft 71 and arm 40 are then lowered until the record carried by fingers 47 engages spindle 50; the fingers 47 are then spread to release the record. Shaft 71 and arm 40 are then raised and rotated back to the original position, as determined by back stop 74 against which stop pin 80 on arm 40 bears. Stop pin 80 is properly centered in the post by the U-shaped bracket 81 (Figure 13) held in the underside of arm 40. The operating mechanism (described in connnection with Figures 16 to 19, 22 to 24) raises, rotates and moves shaft 71 continuously through this full cycle.

Figures 13, 15:
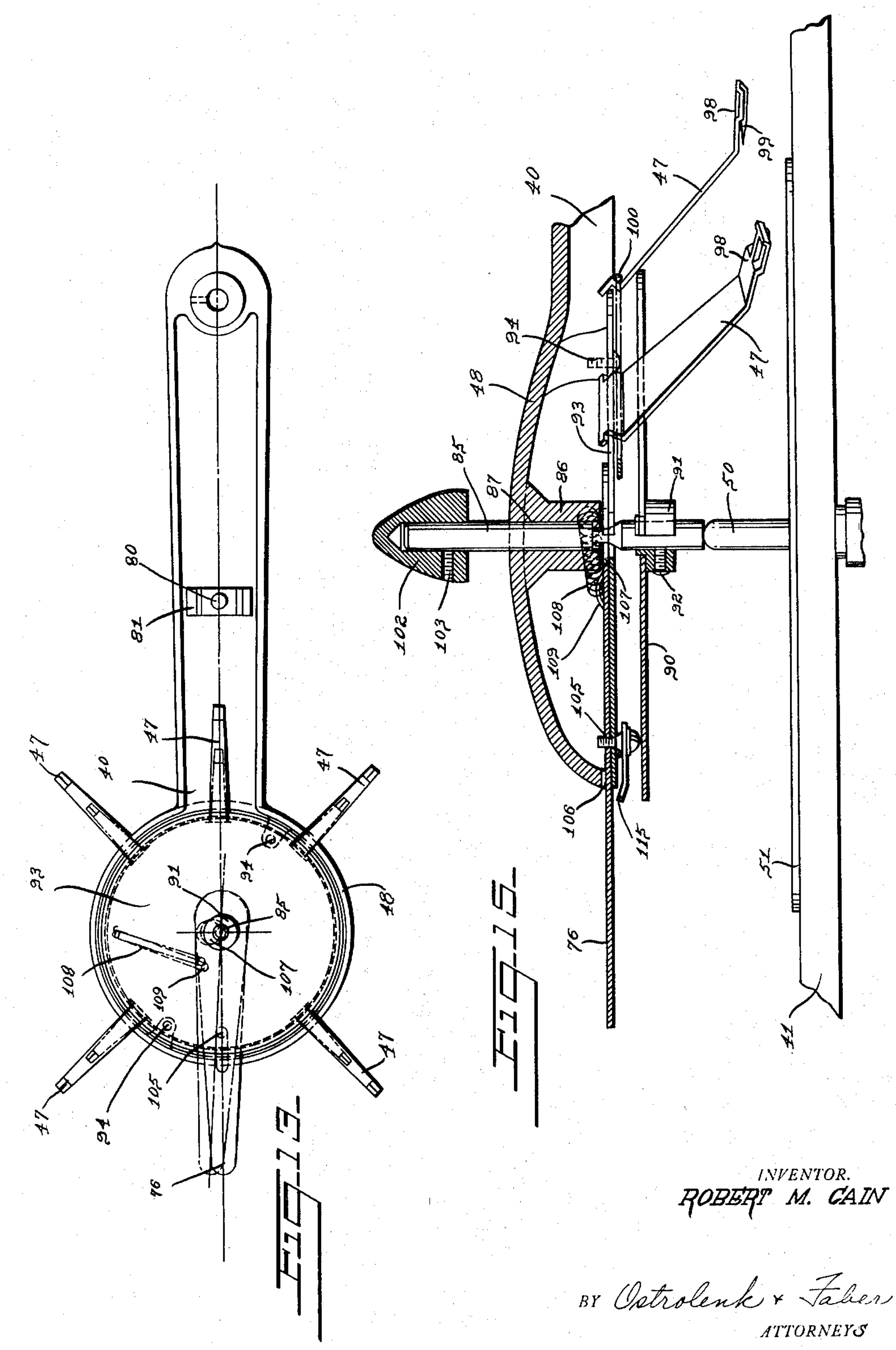
Figure 13 is a bottom view of the record loading arm.
Figure 15 is a view corresponding to that of Figure 12 showing the finger latch engaged and the fingers spread to drop the record.
Figure 14:
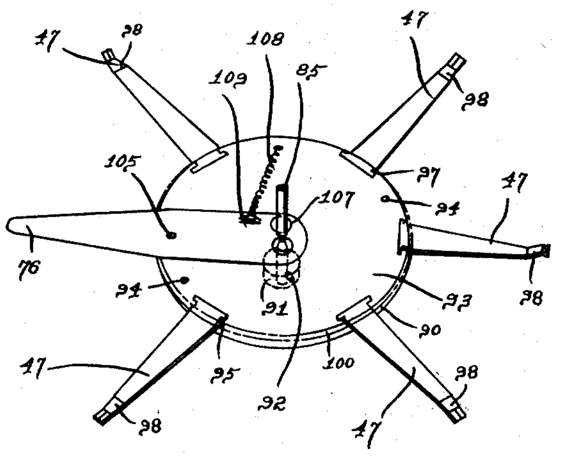
Figure 14 is a view corresponding to that of Figure 11 showing the finger latch engaged and the fingers spread to drop the record.

The mechanism for moving the fingers 47 from the record engaging position shown in Figures 2, 4, 9, 10, 11 and 12 to the record disengaging position shown in Figures 14 and 15 depends on the movement of the arm 40 for its operation on the latch lever 76, the latch trip bracket 75 for the latch lever 76, and the co-action of spindle 50 of the turntable with pin 85 (Figures 11 to 15) in the head 48 of the loading arm 40.

Figures 10, 11, 12:
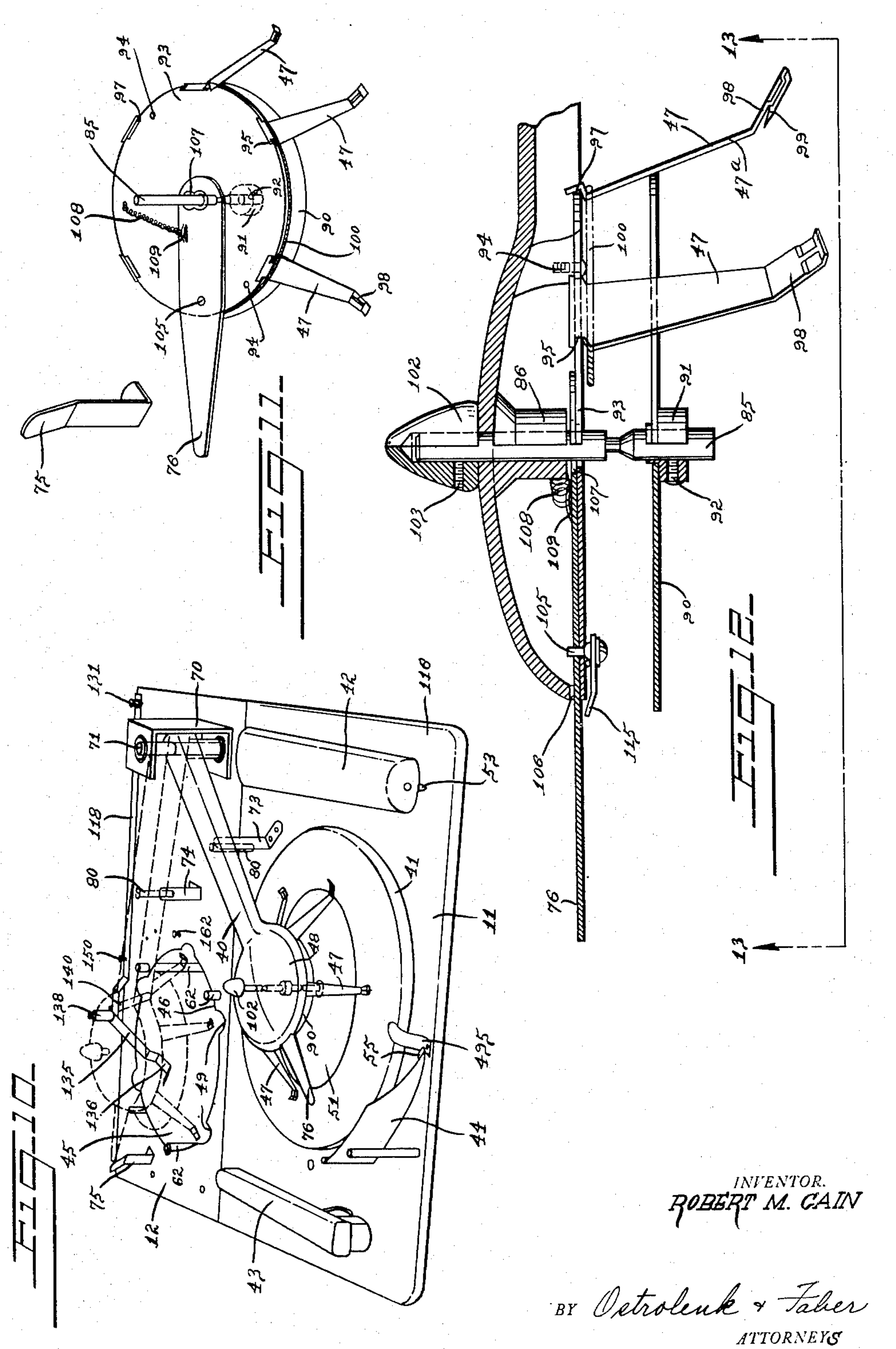
Figure 10 is a view in perspective showing the completion of the record movement to the turntable and return of the loading arm.
Figure 11 is a fragmentary view of the record carrying end of the record loading arm showing the record carrying fingers in record engaging position with the finger latch open and the casting cover removed.
Figure 12 is a side view in vertical section through the record carrying end of the record loading arm showing the elements in position corresponding to that of Figure 11.

The head 48 of the loading arm 40 comprises, as is shown in Figures 2, 12 and 15, a casting which is integral with the loading arm 40. Casting 48 has a bushing 86 connected thereto and which may be integral therewith, said bushing extending on the under side of the head 48 and providing a slideway 87 for the pin 85 so that pin 85 is vertically slidable with respect to the head 48.

The pin 85 carries adjacent its lower end the finger spreading plate 90 swedged to the collar 91 which in turn is secured to the pin 85 in any appropriate manner as by the set screw 92. The lower surface of the head 48 carries the finger mounting plate 93 secured thereto by bolts 94, the said finger mounting plate 93 being of somewhat smaller diameter than the interior diameter of the head 48.

The finger mounting plate 93 is provided with a plurality of recesses 95 in the edge thereof, the number of said recesses being equal to the number of fingers 47 used.

Thus, where five fingers are to be used to grip the record as is the case in the present construction, then five such recesses 95 are provided, each recess being of just sufficient width to receive the upper end of the finger 47 and retain the same against angular movement in a horizontal plane around the head.

Each of the fingers 47 as seen particularly in Figures 12 and 15 is substantially a flat member of sheet metal having a main longitudinal body portion *47a*, an upper re-entrant angular bend 97, a lower outwardly directed annular bent section 98 retaining an inwardly directed pin 99 on its under side.

The upper re-entrant angular bend 97 of the finger 47 provides a lip which seats in the recess 95 of the plate 93, the inner side of the re-entrant bend engaging the recess section 95 of the said plate.

A garter tension spring 100 encircles the fingers 47 just below the plate 93 seating at the portions of the fingers under the re-entrant bend 97 of each finger 47. The tension of spring 100 being equally exerted on all of the fingers tends to rotate the lower ends of the fingers inwardly toward the center of the plate 93, the said fingers pivoting at the connection between their upper re-entrant bends 97 and the recess 95 of plate 93.

The inner surfaces of each of the flat longitudinal sections *47a* of the fingers 47 are thereby rotated against finger spreading plate 90 and are held in position by the garter spring 100.

The combined action of spring 100 acting on the outside of the fingers 47 to rotate them inwardly and that of the finger spreading plate 90 bearing against the inner surface of the fingers 47 serves accurately to locate the angular position of the fingers 47 with respect to the head 48 of the loading arm.

When the pin 85 carrying the finger spreading plate 90 is raised bringing the plate 90 up closer to the finger mounting plate 93, then the fingers 47 are spread or rotated outwardly from the position of Figures 11 and 12 to the position of Figures 14 and 15, thereby moving the fingers between the two positions shown in Figure 13.

The fingers 47 are thereby moved to the record disengaging position. When, on the other hand, finger spreading plate 90 descends to its original position shown in Figures 11 and 12, then the pins 99 on the lower ends of fingers 47 are brought to the record engaging position.

The spring 100 by compressing the fingers 47 inwardly exerts through these fingers a camming action on finger spreading plate 90 tending to hold it in the lower position to which it returns by its own weight. The knob 102 secured in any suitable manner as by the set screw 103 to the upper end of the pin 85 determines the lowest position of pin 85 and hence of the finger spreading plate 90.

The stop 73 for record loading arm 40 when the record loading arm is moved from the position of Figure 2 to the position of Figure 10 is adjusted to determine the exact location of the arm 40 where the pin 85 extends exactly over and in registry with the spindle 50 of the turntable 41.

When the arm 40 after reaching this position with a record carried thereby is lowered, then the lower end of pin 85 moves down against the spindle 50 and on continued downward movement of the arm 40 the pin 85 is raised with respect to the arm 40 from the position shown in Figure 12 to the position shown in Figure 15, thereby raising the finger spreading plate 93 and spreading the fingers 47.

The latch lever 76 is pivotally mounted on pin 105 carried by the finger mounting plate 93, latch lever 76 extending over the upper surface of the plate 93 and emerging through slot 106 at the forward end of the casting or head 48.

The inner end of the latch lever 76 is provided with a latching opening 107, which opening is somewhat larger than the diameter of pin 85 and which surrounds the pin 85.

Tension spring 108 connected at pin 109 to the latch lever 76 and at pin 110 to plate 93 biases the latch lever for counterclockwise rotation with respect to Figure 14 about its mounting pin, biasing the edge of latching opening 107 against the pin 85.

Pin 85 is provided with a latching detent 112. When pin 85 is raised to a point where the latching detent 112 rises above the latch lever 76, tension spring 110 rotates the latch lever 76 to a position where one edge of the opening 107 enters into the latching detent 112, thereby holding the pin 85 in the up position of Figures 14 and 15 and spreading the fingers 47 apart.

The pivot pin 105 for the latching lever 76 in addition carries the spring guide 115 for the garter tension spring 100 to ensure that spring 100 will be retained in position at all times and will not tend to slide down the spring fingers 47 under any circumstances.

With the fingers 47 now spread because of the upwardly held position of finger spreading plate 90 and pin 85 owing to the engagement of latch lever 76 in latching detent 112 of pin 85, the record 51 held by the fingers will now be caused to drop on to the spindle 50.

After the record loading arm 40 is returned to its original position over the record stack, then when the arm 40 is lowered once more the latch lever 76 strikes against the chamfered surface of the latch trip bracket 75 during the downward movement of the record loading arm 40, thereby rotating latch lever 76 in a clockwise direction with respect to Figure 14 and moving the edge of opening 107 out of the latching detent 112 of pin 85, thereby permitting pin 85 and finger spreading plate 90 to drop and to permit garter tension spring 100 to rotate fingers 47 back to the record gripping position.

Thus, summarizing the operation, the record loading arm 40 is positioned over the record stack 45 accessible through opening 46 in the record loading base 12. When shaft 71 in bracket 70 which carries the record loading arm 40 is lowered, the record gripping fingers 47 which have been held in the position of Figures 14 and 15 are replaced in the position of Figure 12 by the engagement of the latch lever 76 against the latch trip bracket 75. This disengagement occurs at the lowest end of the downward movement of the record loading arm 40.

The fingers 47 and pins 99 thereof are thereby simultaneously moved inwardly by the spring 100 to engage the topmost record of stack 45. The record loading arm is now raised by the continued operation of operating mechanism 12, hereinafter described, lifting the top record of the stack with them.

The record loading arm 40 is swung over to a position where its head 48 moves over the turntable 41, the stop 73 being so arranged that the pin 85 which coincides with the center of the record 51 moves and stops exactly over the spindle 50 of the turntable 41.

When the record loading arm 40 is now lowered, the lower end of pin 85 abuts the upper end of spindle 50 and on continued lowering movement of the record loading arm 40 the pin 85 is raised with respect to the record loading arm to raise the finger spreading plate 90 and to spread the fingers 47 from the position of Figures 11 and 12 to the position of Figures 14 and 15.

Figure 9:
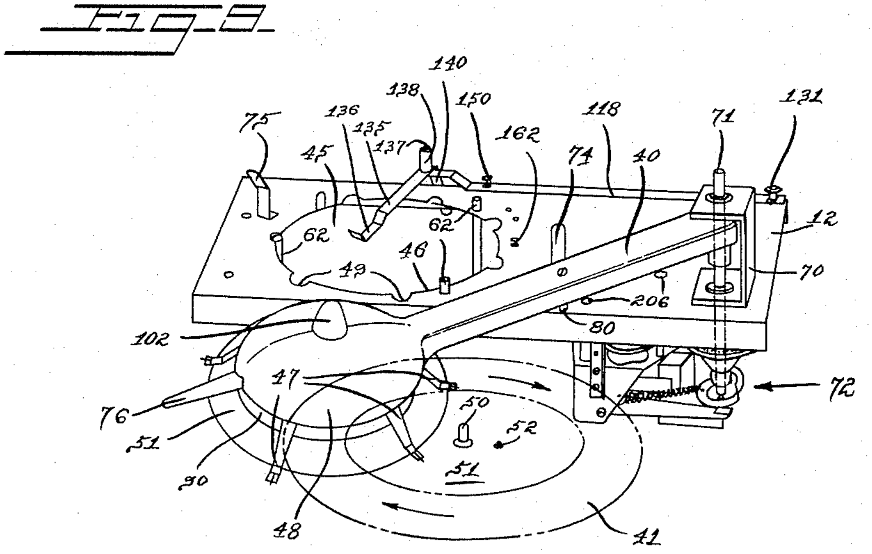
Figure 9 is a view in perspective showing the record loading arm carrying a record and approaching the turntable.

The movement of the record loading arm from the position where it overlies the record stack to the position where it overlies the turntable is shown schematically in Figures 9 and 10.

On completion of the downward movement of the record loading arm 40 over the turntable 41, the pin 85 having been raised to the position of Figures 14 and 15, the fingers 47 are spread apart simultaneously so that the pins 99 define a diameter much larger than the record, thereby releasing the record 51 and permitting it to drop over the spindle 50.

To prevent re-engagement of the fingers with the record, the finger spreading plate 90 is latched up by the latch lever 76 which engages the pin 85 as previously described.

The record loading arm having completed its downward movement and having deposited the record 51 on the turntable is then promptly raised once more and rotated back to its initial position where it overlies the stack 45 of records ready for the next record loading operation.

*Ib. Record stack support and elevator assembly*

In order that the record loading arm 40 operate properly, it is necessary that the record stack 45 be so supported and operated that the top record of the stack 45 will always be in position to be engaged by pins 99 at the ends of fingers 47 when the record loading arm 40 is lowered toward the stack to pick up a record.

For this purpose, the platform 60 which supports the lower end of the stack of records is carried on the elevator 61 which operates on one of the guide rods 62. Three guide rods 62 are provided supported from the underside of the base plate 12 and being reinforced by the bracing plate 63 at the bottom. The guide rods 62 may be adjustably mounted for longitudinal adjustment in base plate 12 to permit levelling of platform 60.

The record elevator 62 comprises a motor 120 connected by the gear train 121, 122, 123, 124, 125 to the friction wheel 126 which engages one of the guide rods 62.

The shaft 127 of friction wheel 126 is connected by gears 128 and 129 to shaft 130 of friction wheel 131. Friction wheels 126 and 131 are offset on opposite sides of the guide rod 62 in such manner that the load of records on platform 60 and hence on the elevator housing 61 tends to create a slight counterclockwise rotation of shafts 127 and 130 around each other, forcing the friction wheel 126 down against the guide rod 62 and friction wheel 131 up against the guide rod 62.

The gear ratio of the gear train herein described is designed to produce an extremely slow rate of rotation of friction wheels 126 and 131—of the order of 100,000 to 1 so that the elevator 61 and the platform 60 carried thereby which supports the record stack 45 will rise very slowly when the motor 120 is enegized. This slow rate of operation or raising of the stack is useful since the stack must be raised accurately to a position where the next record is available for picking up by the record loading arm; but since the records are of the order of $\frac{1}{16}$ of an inch thick or less, accuracy in the rise of the stack is obtained by the slow upward movement; and control of the stack so that it will stop rising at exactly the right point is also facilitated.

When for any reason it is necessary or desirable to lower the platform 60 once more for replenishing the stack of records, it is only necessary to raise the platform 60 manually at the side thereof opposite the friction wheels 126 and 131, thereby lifting the wheel 126 away from the guide rod 62 and pushing wheel 131 in an opposite direction.

This will permit the platform 60 and elevator 61 to be lowered to a position where record replenishment may be accomplished. After the record stack is replenished, the elevator 61 and platform 60 will rise to the proper position for the topmost record in the stack in the manner hereinafter described.

It is thus necessary to provide switching means responsive to the height of the topmost record in the record stack in order to control the elevator 61.

For this purpose I provide the switch actuating lever 118. Switch actuating lever 118 is loosely mounted on the pivot pin 119 located at the right rear portion of the base plate 12 (Figures 2 and 10) and shown in detail in the opposite side in Figure 5.

The pivot pin 119 is held in position on the base plate by the screw 132 which passes therethrough and which may be adjusted. A coil spring 133 is captured between washer 134 and the end of switch actuating lever 118. Switch actuating lever 118 may rotate horizontally about the pivot 119 and also may rotate vertically from the position shown in Figure 7 to the position shown in Figure 8 and back again on the pivot 119, being biased to the down position of Figure 7 by its own weight and additionally by the action of the coil spring 133.

Switch actuator arm 118 has connected thereto the auxiliary actuating cross arm 135 which has a section 136 extending over the record stack 45. Cross actuating arm 135 is connected to the switch actuating arm 118 by the screw 137 which passes through bushing 138 and through the actuating cross arm 135 and the end of switch actuating arm 118 adjacent the record stack.

The actuating cross arm 135 has a downwardly directed extension 140 which normally is received behind the positioning bracket 141 carried by flange 12*a* (Figure 5) extending down from the base plate 12.

Bushing 138 serves as a handle by which the switch actuating arm 118 and cross arm 135 may be lifted, rotating vertically about the pivot 119 until the downwardly directed extension 140 of cross arm 135 clears the bracket 141 so that the switch actuating arm 118 may be rotated outwardly until section 136 of the cross arm 135 clears the stack 45.

Records may then be placed on the stack 45 replenishing the stack, the elevator 60 and the platform 61 being lowered to permit this to occur.

Figure 5:
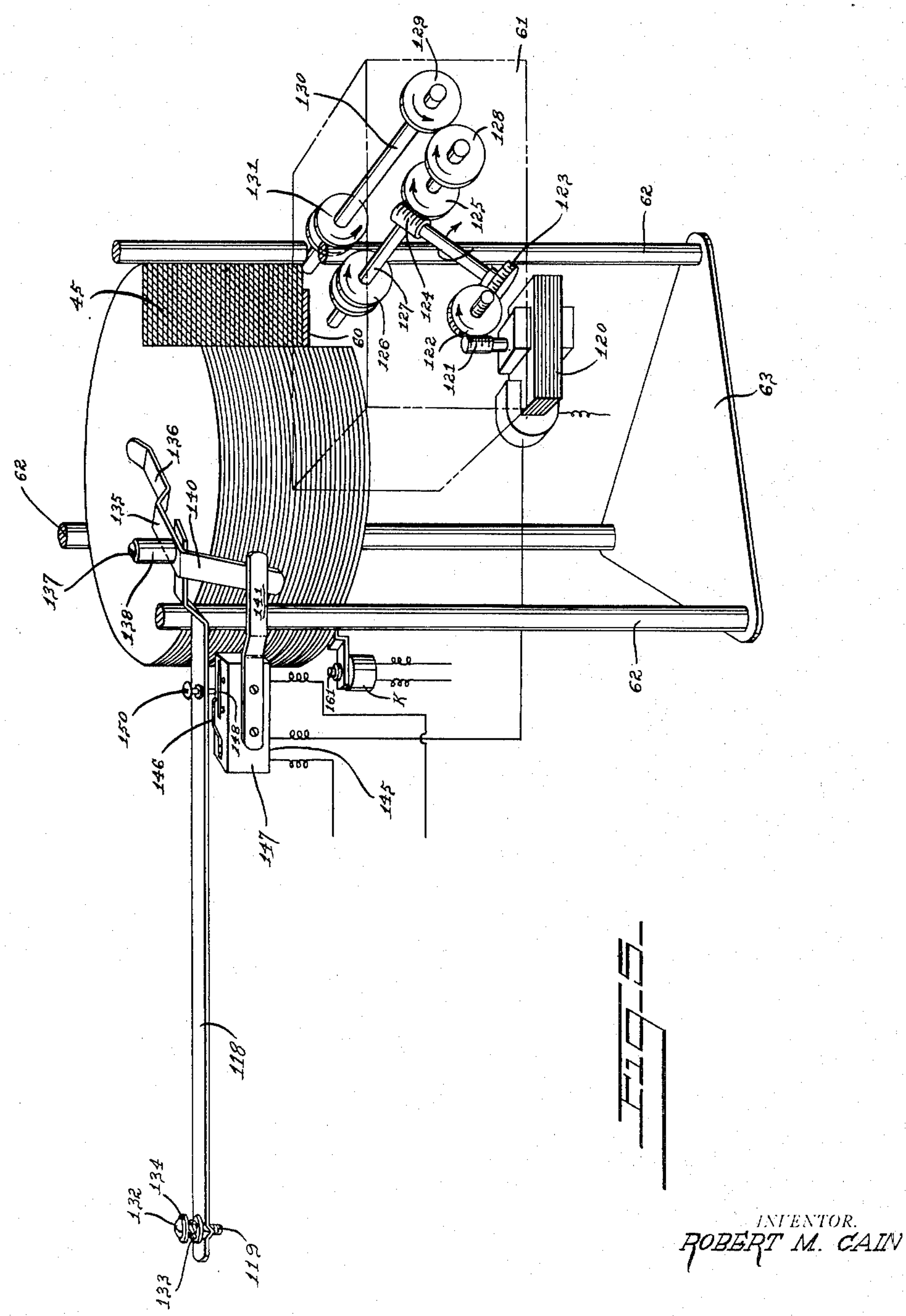
Figure 5 is a view in perspective of the elevator assembly for the record storage portion of the record storage and loading arm assembly of Figure 4.

After the records have been placed on the stack 45 and the entire stack lowered until the topmost record of stack 45 is well below the level of base plate 12, then the switch actuating arm 118 is rotated inwardly once more and moved down to the position shown in Figures 5 and 7 where the engagement of the downward extension 140 of cross arm 135 behind bracket 141 holds the switch actuating arm 118 in appropriate position where it may respond to variations in the height of the record stack.

In addition, the mounting of the switch actuating arm 118 for vertical compliance simplifies the removal of a record. That is, section 136 of cross arm 135 rests on the top record in the stack. After the fingers 47 engage the top record of the stack, the loading arm 40 rises up so that the record may be removed. The switch actuating arm 118 and its cross arm 135 are thereby raised by the lifting of the top record of the stack and remain raised until the top record of the stack is slid out from under section 136 of cross arm 135. This occurs within a second or two after the record is first engaged by the fingers.

The cross arm 135 and the switch actuating arm 118 then drop back so that section 136 is in position to engage the next top record in the stack.

Assuming now that the circuits are properly prepared for energization (a full description of the electrical circuits will hereinafter be set forth in connection with Figures 37 and 38) switch B2 connected to the elevator motor 120 energizes the motor 120 when it is closed as hereinafter described in connection with Figure 37. Switch B2 is preferably a micro-switch which is normally open having the operating lever 148 spring biased upwardly to the open position (see Figure 7).

The slug rejector sensing micro-switch contact B1 is normally closed having the operator 148 spring biased toward the closed position.

The switch actuating screw 150 is carried by the switch actuating lever 118, being adjustably mounted for appropriate engagement and disengagement of the micro-switch operator 148.

Figure 8:
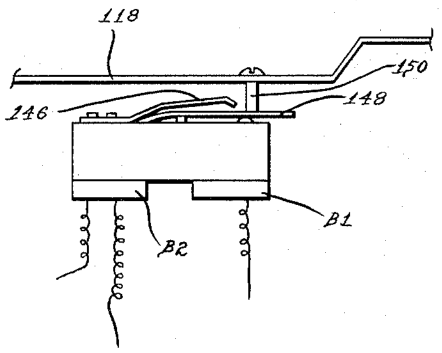

When the top record in the record stack 45 is too low as after the removal of a record or after the replenishment of a stack of records with the top record being left in a too low position, section 136 of cross arm 135 drops down toward the top of the record stack permitting the switch actuating arm 118 to fall to the position of Figure 8 where micro-switch operator 148 is depressed to open the micro-switch B1 and simultaneously to close the switch B2. Lever 146 is a back-stop to prevent further movement upward of actuator 148.

The closing of switch B2 energizes the motor 120 to raise the elevator 61, the record stack platform 60 and the record stack 45. This operation continues until the top record of stack 45 lifts section 136 of cross arm 135 to raise the switch actuating arm 118 and the switch actuating screw 150 from the position of Figure 8 to the position of Figure 7, whereupon micro-switch operator 148 is raised. This opens switch B2 disconnecting the motor 120 and leaving the record stack 45 at a position where the top record in the stack is at the right level to be engaged by the record loading arm fingers and closes switch B1 to permit the coin mechanism to operate as hereinafter described in connection with Figure 37.

Figure 7:
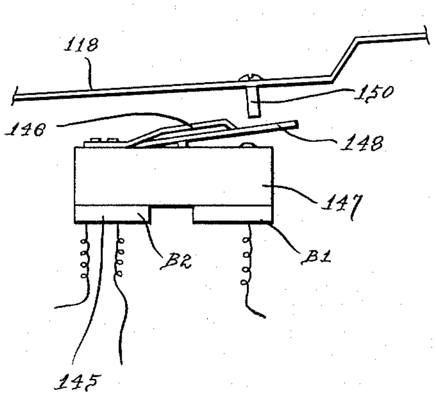
Figures 7 and 8 are side views of the elevator motor switch control in the closed and open positions respectively.

When a record is removed from the top of the stack, then the dropping down of section 136 of cross arm 135 permits the cross arm 135 and switch actuating lever 118 to drop drown again to the position of Figure 8, closing the switch B2 and re-energizing the motor 120 and opening switch B1 until the record stack 45 is raised once more to a position where the top record in stack 45 lifts the switch operating assembly to the position shown in Figure 7 where switch B2 is opened again and motor 120 ceases to operate.

Since the record loading arm fingers will not engage a record on the top of a stack until the top record in the stack has reached the proper level, the switch B1 is provided to disconnect the coin operated relay which starts the full cycle until the record stack 45 has been raised to a point where the record loading arm will pick up a record.

This will prevent the movement of the entire mechanism through a cycle with no record actually being transferred to the turntable for operation.

When, however, a record is in position at the appropriate level to be picked up by the loading arm fingers 47, then the switch actuating apparatus is in the position shown in Figure 7 with switch B1 closed and switch B2 open. The apparatus may now go through its complete cycle as herein described.

The platform 60 also carries a normally closed micro-switch K having the button 161 arranged to abut against the under side of the adjustable screw 162 carried by base plate 12. Button 161 is positioned and screw 162 is adjusted so that after the last record in the stack is removed, then on the next operation tending to raise platform 60, switch button 161 will move up against the screw 162 to open the switch K.

Switch K is connected in series in the circuit to all of the apparatus so that the entire machine is halted when switch K is opened. Accordingly, switch K must be adjusted so that after the last record has been taken from the top of the stack, it will not open until after delivery of the last record but will open shortly thereafter.

In addition, to ensure that the apparatus will not operate to accept a coin after the last record is sold, platform 60 is provided with a cut-out 165 registering with the cross arm 135 and its extension 136 so that after the last record is removed from the platform 60, the cross arm 135 and its extension 136 will fall to the lowest possible position to ensure that the switch actuating apparatus will be in the position of Figure 8 wherein switch B1 remains open to prevent actuation of the mechanism by dropping a coin in the slot, thereby preventing the operation of the apparatus for a meaningless run through of its cycle when no record is provided for use therein.

II. *Arm operating mechanism*

The operating mechanism for the record loading arm 40 is shown in Figures 16 to 19 and 22 to 24.

This operating mechanism, however, with slight modifications hereinafter described is duplicated for operating the cutting arm 42 toward and away from the record cutting position and is also utilized with slight modifications hereinafter described to operate the play-back arm 43 toward and away from the play-back position.

The essential difference in the operation of the record loading arm on the one hand and the record cutting arm and play-back arm on the other hand is that the record loading arm is moved completely under the control of its operating mechanism from its position above the stack to its position above the center of the turntable and back again to its original position above the stack.

The record cutting arm on the other hand is moved into a position where its stylus registers just within the margin of the record. Thereafter the cutting arm 42 is lowered and moves under the control of another mechanism, hereinafter described, and not under the control of the cutting arm operating mechanism.

After the record cutting operation is completed, the record cutting arm once more moves under the control of the arm operating mechanism back to its original position.

The same situation obtains for the play-back arm. Its operating mechanism instead of moving the play-back arm through its full cycle moves the play-back arm only to a point just within the outer margin of the record. Thereafter the play-back arm tracks in the groove of the record until it reaches the end of the record groove. Then the play-back arm returns once more under the control of the arm operating mechanism.

Hence, although the specific mechanism described in Figures 16 to 19 and 22 to 24 may properly be called the loading arm operating mechanism, it has been given the generic title of arm operating mechanism owing to the fact that with slight modification it may operate any of the three arms 40, 42, or 43.

The function of the operating mechanism with respect to the record loading arm 40 is first to lower the arm 40 until the fingers 47 engage the top record of the stack and then to raise the arm 40 until the top record of the stack clears the top surface of the base plate 12, as well as rising above the upper end of the spindle 50.

The record loading arm is then swung toward the spindle 50 with the arm and record in the elevated position until the center of head 48 of the record loading arm 40 registers exactly above the spindle 50.

The record loading arm 40 is then lowered to drop the record over the spindle 50 on the turntable 41. Thereafter the record loading arm is immediately raised with its fingers 47 extended as previously described and returned to its position above the record stack.

The record loading arm mechanism 72 is shown most clearly in Figures 16, 17, and 18. The mechanism 72 is supported in the L-shaped bracket 200 having the horizontal platform 201 and the vertical side support 202.

An electric motor 203 is supported in any suitable manner as by the bolts 204, 204 from the horizontal platform 201 of the bracket 200. The bracket itself is supported by the hollow threaded posts 205, 205 from the under side of base plate 12, the posts being secured to the base plate 12 by the screws 206 passed through appropriate openings in the base plate 12 and threaded into the posts 205.

The motor shaft 207 drives the worm 208 which in turn drives spiral gear 209 on shaft 210. Shaft 210 rotates in bearings in lug 211 on the upper surface of platform 201 and in bracket 212 secured by screws 213 to the vertical support bracket 202.

Worm 215 on shaft 210 drives spiral gear 216 on stub shaft 217. Spiral gear 216 is connected by pin 218 to the cam 219 also rotatable on the stub shaft 217, the connection by pin 218 being such that the cam 219 must rotate together with gear 216.

Bell crank lever 220 is rotatably mounted on pin 221 carried at the lower end of the vertical support bracket 202 and extending parallel thereto. The upper end 222 of the bell crank lever 220 extends through slot 223 in platform 201 and carries the cam follower 225 which bears against the side of the cam 219.

The opposite end of bell crank lever 220 terminates in the substantially horizontal platform 227 which bears against the adjustment screw 71a at the lower end of shaft 71.

Shaft 71 in addition to being supported in the bracket 70 hereinbefore described is also journalled for slidable and rotational movement with respect to the sleeve 230 having the extending annular ledge 231 on the upper surface of base plate 12 and bracket 70 and having a threaded section 232 on the under side of base plate 12 receiving the securing nut 233 which holds the sleeve 230 is position.

The lower end of sleeve 230 has secured thereto the hub bushing 235 held in position thereon in any suitable manner as by the set screw 236. The clutch driving plate 240 is rotatably mounted on the annular recess 241 of the hub bushing 235. Clutch plate 242 is also rotatably mounted in the annular hub recess 241.

In the embodiment shown in Figures 16 to 19, the connection between the clutch drive plate 240 and the clutch plate 242 is an annular pressure spring 244 comprising a spring metal member 245 wrapped around the edge of the clutch plate 242 and held in tension thereagainst by the tension spring 247 connected between the ends of the pressure spring member 245.

The annular spring metal member 245 is recessed at 250 at a point opposite the tension spring 247 to receive and position the end of the clutch drive plate 240. The tension of the annular spring metal member 245 is ordinarily sufficient to transmit a driving motion from the clutch drive plate 240 to the clutch plate 242.

However, if the clutch plate 242 is held stationary by a positive force as hereinafter described, then the clutch drive plate 240 may continue to rotate about its hub 241 in the hub bushing 235 even though the clutch plate 242 is thus held stationary.

In Figures 20, 21, and 22 I have shown a variation of this frictional connection which is actually preferred and which may be substituted for the annular pressure spring 244. This will be hereinafter described.

The lower end of post 71 above the set screw 71a is provided with the crank plate 260 which is an extension of the collar 261 secured to the lower end of post 71 by the set screw 262. The outer end of the crank plate 260 carries the bushing 265 for the dog pin 266 which is slidably mounted in the bushing 265 for vertical movement with respect thereto and is biased upwardly by the spring 267. This sub-assembly is more clearly shown in Figure 23.

A stabilizer plate 270 has an opening surrounding the post 71 and extends outwardly with the outer opening 272 thereof surrounding the stationary pin 273 supported from the under side of the base plate 12. A spring washer 275 is captured between the stabilizer plate 270 and collar 276 which is wedged to post 71.

A compression spring 280 is captured between the upper surface of collar 276 and the underside of clutch plate 242. Compression spring 280, therefore, by exerting pressure between the under side of clutch plate 240 and the upper surface of collar 276 of post 71 biases the post 71 downwardly, thereby biasing the record loading arm 40 downwardly. This causes the lower adjustable extension 71a of post 71 to push downwardly against platform 227 of end 226 of bell crank lever 220, thereby rotating the bell crank lever 220 counterclockwise with respect to Figure 17 so that the cam follower 225 thereof bears against the cam 219.

The upper surface of gear 216 carries the drive pin 300 which is connected to one end of link 301. The opposite end of the link 301 is connected to pin 302 on the clutch drive plate 240.

Cam 219 has two recesses 219*a*, 180° apart, and two extensions 219*b*, also 180° apart and spaced 90° from the recesses 219*a*.

When now motor 203 is energized to rotate gear 216 and cam 219 simultaneously, then the rotation of gear 216 causes pin 300 to rotate about the stub shaft 217 and through the link 301 causes the clutch drive plate 240 to rotate about its hub 241 on the hub bushing 235.

The operation with respect to the record loading arm commences at a point where follower 225 of bell crank lever 220 is just about to enter the recess 219*a* of the cam 219. As the gear 216 and cam 219 rotate, the follower 225 enters the recess 219*a* of cam 219, thereby permitting platform 227 and end 226 of the bell crank lever to drop down. This permits the coil spring 280 to force down the post 71, thereby lowering the record loading arm 40 so that the fingers on the record loading arm are unlatched to engage a record.

At this time the rotation of gear 216 results in movement of link 301 to rotate the clutch drive plate 240, thereby rotating the clutch plate 242, but since there is yet no connection between the clutch plate 242 and the shaft 71 so that the shaft 71 is not subject to any rotative force.

As the gear 216 and cam 219 continue to rotate, cam follower 225 of the bell crank lever 220 is pushed out of recess 219*a* and pushed up on extension 219*b* of the cam 219. Bell crank lever 220 is rotated clockwise with respect to Figure 17 raising the platform 227 and hence raising the post 71.

The post 71 is raised to a point where the dog pin 266 carried by crank plate 260 engages the under surface of the clutch plate 242 seating in one of the holes 242*a* in the periphery thereof. The spring 267 permits the dog pin 266 to move downwardly with respect to its bushing 265 to permit a full rise of the post 71.

The post 71 is by this means connected in driving relation with the clutch plate 242. Since the link 301 is driving the clutch drive plate 240 around its hub 241, the frictional connection by means of pressure spring 245 between the clutch drive plate 240 and the clutch plate 242 drives the clutch plate 242 around and the connection through dog pin 266 results in rotating the post 71.

The post 71 is thus rotated from its position above the record stack to a position where the head 48 thereof moves over the center of the turntable. At this point the record loading arm 40 moves against the stop 73 which predetermines the outward position of the record loading arm.

The operating mechanism is adjusted so that this outward position of the record loading arm 40 will be reached at less than a 180° rotation of the gear 216 and cam 219.

At this point since the record loading arm 40 is held stationary, the post 71 is also held stationary while, however, the gear 216, link 301, and drive plate 240 continue to rotate.

Owing to the frictional connection by pressure spring 245, however, between the clutch drive plate 240 and the clutch plate 242 the clutch drive plate 240 may now slide with respect to the clutch plate 242 so that the gear 216 and the cam 219 may continue their rotation.

At the end of 180° rotation from its initial position, the opposite cam recess 219*a* moves opposite the cam follower 225 and spring 280 may now drive the post 71 down pushing down the end 226 of the bell crank lever 220 and pushing the follower 225 into the opposite recess 219*a* of the cam 219.

The record loading arm 40 thus moves downwardly to release the record on to the turntable in the manner previously described while the record loading arm is held stationary.

Owing to the manner of connection of link 301 between pins 300 and 302, continued rotation of gear 216 and cam 219 in the same direction will now result in pulling back the drive plate 240 toward its original position.

The motor 203 and gear 216 and cam 219 continue to rotate at all times. No rotative motion is, however, communicated to the record loading arm 40 while it is in the down position owing to the fact that the dog pin 266 has disengaged the clutch plate 242.

On continued operation of gear 216 and cam 219, the recess 219*a* moves away from the follower 225 of the bell crank lever 220 and the bell crank lever rides up toward the extension 219*b*. This rotates the bell crank lever once more in a clockwise direction raising end 226 thereof and lifting the post 71 until the dog pin 266 carried by crank plate 260 on the post 71 engages an opening 242*a* in the clutch plate 242 whereupon driving connection is established between dog pin 266, clutch pin 242, clutch drive plate 20, 301, 401, to the gear 216.

The elements are now rotated back to their original position until the record loading arm strikes the stop 74 whereupon the frictional connection through pressure spring 245 permits clutch drive plate 240 to slide with respect to the clutch plate 242 until the full 360° cycle of operation is completed.

The pin 218 which connects the gear 216 and the cam 219 has a downward extension 218*a* beneath the cam plate 219, which downward extension is adjusted to actuate switch operator 310 for switch 311 (hereinafter also referred to as switch C) at the completion of a 360° cycle of rotation of cam 219 and gear 216. The motor 203 is then halted at this point as hereinafter described, and the record loading arm is back in its original position.

In Figures 16 to 19 I have shown a pressure spring 245 for frictionally interconnecting the clutch drive plate 240 and clutch plate 242.

In actual commercial use I have found, however, that a simple friction shoe may more conveniently be used. This variation is shown by itself in perspective in Figure 22 and in cross-section in Figures 20 and 21, Figure 20 showing the cutter arm operating mechanism and Figure 21 showing the play-back arm operating mechanism.

As shown in these figures, the clutch drive plate 240 which is identical with the clutch drive plate of Figures 16 and 17 carries at the end opposite pin 302 the U-shaped pressure spring 245*a* secured thereto in any suitable manner as by the rivets 320. The U-shaped pressure spring 245*a* extends beyond the edge of the clutch drive plate 240 and under the clutch plate 242. The under leg of the U-shaped pressure spring 245 carries on its upper surface the clutch friction shoe 245*b* which by reason of the fact that pressure spring 245*a* is made of spring metal tending to drive the legs of the pressure spring together is brought up into frictional engagement with the clutch plate 242.

The assembly is facilitated by this modified form, but the operation is identical with that previously described. In addition, the lower end of post 71 carries beneath the collar 261 an additional collar 330 shown also in perspective in Figure 24.

The collar 330 is secured to the post by set screw 331 and carries the crank plate 332 to the end of which is secured the rivet 333 which acts as a pivot for the toggle link 334. Toggle link 334 is a substantially circular member surrounding extension 71*a* of post 71 and having an opening 335 at the side opposite its securement to rivet 332 to which is connected the tension spring 336.

The other end of tension spring 336 is connected to opening 337 in the vertical leg 202 of the bracket 200. The toggle link 334 and tension spring 336 serve to provide a biasing force, toggle fashion, at each extreme end of the loading arm angular travel. In other words, when the arm is over the record stack, the force of the spring 336 is exerted from its anchored end 337 to the rivet pivot 333 and the line of force is such that it aids or assists all other forces acting on the post 71 and hence the arm to bias the arm definitely toward the stop which limits its travel and determines its position over the record stack. When the arm is over the turntable, the line of force is on the opposite side of the post 71, hence, biases the arm against its inner limit stop. The effect is to get a definite, clear to the end, positive movement and prevents the arm from bouncing away from the stops after they have been reached.

Actually, the arrangement increases the movement of the arm, making sure it does get to the stop and stays there. The ring 334 is merely a means of straddling the post and getting an across center force.

Since the cutter arm of Figure 20 and the play-back arm of Figure 21 are not as heavy as the record loading arm 40 and since they do not carry a record which may accidentally be jarred loose, the toggle link assembly including the toggle link 334 is not necessary in the operating mechanism of the cutter arm shown in Figure 20 or the operating mechanism for the play-back arm shown in Figure 21.

III. *Record cutting arm*

In Figures 20, 25, and 26 I have shown the adaptation of a duplicate of the operating mechanism 72 of Figures 16 to 19 to the cutting arm 42.

The operating mechanism utilized is identical except for the fact that the toggle link 334 and its associated tension spring 336 are not necessary and, therefore, are not used.

The only other modifications of the operating mechanism of Figures 16 to 19 is that instead of the crank plate 260 of the operating mechanism of Figures 16 to 19 being utilized to carry the dog pin 266, the follower arm assembly 350 for the cutting arm which is secured on the post 372 of the cutting arm by set screw 373 in the same location as the crank plate 260 of the mechanism of Figures 16 and 19 is utilized.

Also, instead of causing the operating mechanism of Figure 20 to go continuously through a 360° cycle, the operating mechanism goes through a 180° cycle, then halts and then goes through the remaining 180° cycle.

The full operation will be better understood from a more complete description of the cutter arm structure. The cutter arm structure and associate elements may readily be seen not only in Figures 20, 25, and 26 but also in Figure 3 which is a view of the under side of the base plate 11 of the mechanism.

Cutter arm 42 and post 372 are normally in the down position when they are at rest and removed from the turntable as shown in Figures 2 and 3.

When the operating mechanism of Figure 20, which as above described is similar to the operating mechanism of Figures 16 to 19, is energized, the bell crank lever 209 of Figure 20 is first rotated in a clockwise direction by cam 219 to raise the adjustable end 372*a* of the post 372 to lift the post 372 and the operating arm.

When the dog pin 266 on follower 350 engages the clutch plate 242 (Figure 20), the post 372 is then rotated to swing the cutter arm 42 inwardly toward the record.

The follower arm 350 carries the index plate 353 eccentrically mounted by adjustable screw 354 on the bracket 355. The eccentric adjustment permits adjustment of the position of the index plate by rotating the same.

In the raised position of the follower 350 and post 372 the index plate 353 is in position to engage the index stop spring 358 on the under side of the base plate 11 (see in Figure 3).

The index stop spring 358 is also adjustably mounted by means of screw 359 and is so arranged that the inner edge of the index plate 353 will engage the extension of the index stop spring at the point where the cutting stylus 53 of the cutting arm 42 is just within the margin of the record 51.

At this point the follower 350, post 372 and the cutting arm 42 will be held stationary by reason of the engagement of the index plate 353 with the index stop spring 358 even though the operating mechanism continues to rotate the clutch drive plate 240 of the mechanism of Figure 20.

The frictional connection through the clutch shoe 245*b* permits the clutch drive plate 240 to slide with respect to the clutch plate 242 so that the record cutting arm 42 remains in position at the beginning of the record until 180° rotation of cam 219 is achieved, at which time the bell crank lever 220 drops down into the cam recess as above described permitting the post 372 and the record cutting arm 42 to move downwardly until the stylus 53 engages the record surface.

At this point, switch D carried by the cutter arm operating mechanism in substantially the position of switch C above described is operated to halt the motor 203 of the operating device of the cutter operating elements of Figure 20. Also, at this time the index plate 353 moving downwardly with the follower arm 350 disengages the index stop spring 358 so that the follower arm may move with the record cutting arm freely under the index stop spring 358.

The follower 350 carries at its outer end the knife edge pawl 360 struck downwardly out of the spring plate assembly 361 which is secured by bolts 362 to the outer end of the follower 350. Pawl 360 engages the feed screw 365 driven through the gear housing 366 from the turntable 41 which in turn is driven by the turntable motor 367.

The movement of the follower owing to the connection with screw 365 and the consequent recording movement of the cutter arm 42 then proceeds in accordance with the disclosure contained in Patent No. 2,351,948 until the recording operation is completed.

As the pawl 360 and follower 350 are driven in toward the inner end of the screw 365 slowly swinging the cutter arm 42 inwardly with them, then the actuator bumper 382 moves against lever 380 of switch H operating the switch to give a warning that only a short time remains for recording, i. e., 15 seconds. Switch H is adjustably mounted on adjustable arm 349 to permit it to be swung to various positions for various warning times.

Then as the arm moves in further, the switch actuating bracket 382 carried by the follower 350 strikes switch operator 348 of switch F which results, as hereinafter described, in re-energization of motor 203 of the operating apparatus of Figure 20.

The motor operates the cam 219 and associated elements through the remaining 180° cycle of rotation thereof, the cam first lifting the bell crank lever 220 in a clockwise direction to raise the post 372 and the cutter arm 42, thereby disengaging pawl 360 from screw 365 and disengaging cutting stylus 53 of record cutting arm 42 from the record 51; thereafter when the dog pin 266 engages the clutch plate 242 the cutting arm and its follower 350 are swung outwardly once more until the side of the follower strikes the index stop bracket 385, whereupon the clutch driving plate 240 slides with respect to the clutch plate 242 until the recess in the cam moves opposite the end of the bell crank lever permitting the bell crank lever to drop once more in time to permit the post 372 and the cutting arm 42 to drop. At this time switch D is actuated to disconnect the motor 203.

Thus, at the beginning of the operation the recess in the cam is in registry with the bell crank lever so that the cutting arm and its follower are in the lowered position.

When the motor is first energized, the cam rotates so that the recess moves away from the bell crank lever 222, thereby raising the post 372 and engaging the clutch plate 242 to drive the cutting arm inwardly.

The motor remains energized until the opposite recess in the cam moves in registry with the bell crank lever whereupon the motor is de-energized as the follower 350 and the cutting arm 42 move down to engage the record.

On completion of the recording operation, the re-energization of the motor moves the second recess of the cam away from the bell crank lever 222 raising the post 372 and the cutter arm 42 and at the same time resulting in engagement of clutch plate 242 to rotate the cutting arm outwardly.

When the follower 350 strikes the outward index stop bracket 385, the clutch drive plate 240 slides frictionally with respect to the clutch plate 242 until the recess in the cam once more moves opposite the bell crank lever, permitting the follower 350 and cutting arm 42 to drop downward with the post 372.

The switches which turn motor 203 of the cutting arm operating apparatus of Figure 20 on and off may thus be operated by the cam and may be operated in a manner described in applications Serial Nos. 783,668 and 783,725. The specific operation thereof in the present invention is described in connection with Figure 37.

IV. *Play-back arm*

The operation of the play-back arm is substantially identical with the operation of the cutter arm, the operating structure previously described in connection with Figures 16 to 19 being utilized to operate the play-back arm 21 in the same manner as that previously described for the operation of the cutting arm in connection with Figures 20, 25, and 26.

The only difference in the operation is that instead of the follower arm 350 for the cutter arm an indexing arm 400 is provided for the play-back arm, which indexing arm is secured in the same manner as the follower arm to the post 472 of the play-back arm 43, the said indexing arm carrying the dog pin 266 for operation in the identical manner previously described.

The ndexing arm 400 is provided simply to assure that the play-back arm during its operation inwardly toward the record will be halted just above the margin of the record so that when it drops down, the needle on the play-back arm 43 will engage the record.

Accordingly, the indexing arm 400 carries on its upper surface the leaf spring 401, the height of which is made adjustable by the adjustment screw 402 carried by the indexing arm 400. The indexing spring 401 rides under the indexing bracket 410 secured to the under side of the base plate 11 by flanges 411, 412.

The indexing bracket 410 has at its outer end the downwardly depending flange 413 which acts as a stop for the outward movement of the play-back arm and its indexing arm 400. The indexing bracket 410 carries adjacent its inner end the eccentrically mounted index plate 414 adjustably mounted on the pivot 415, the eccentric mounting making possible an adjustment of the stop position simply by rotation of the plate 414.

When the operating mechanism for play-back arm shown in Figure 21 is operated, it first raises the play-back arm and its post 472 together with its indexing arm 400 in the manner previously described for similar apparatus in the record loading arm and the cutting arm.

Then on engagement of the dog pin 266 with the clutch plate 242, it rotates these elements in a raised position inwardly. The spring 401 strikes against the edge of the index plate 414 holding the play-back arm and its associated elements stationary while the clutch drive plate 240 slides with respect to the clutch plate 242.

When the next recess in the cam is reached permitting the bell crank lever 220 to drop, the play-back arm 43, post 472, and the indexing arm 400 move downwardly and motor 203 of the operating mechanism for the play back arm is de-energized. The needle of the play-back arm 43 engages the record and now may track directly in the groove since the play-back arm is disconnected from its operating mechanism.

As the play-back arm moves inwardly, the indexing bracket 400 engages the lever 420 of the limit switch G to re-energize the motor 203 and raise the play-back arm 43 and its post 472 to rotate the same outwardly away from the record.

On completion of the movement of the play-back arm 43 to its proper outward position, the side of the index arm 400 strikes the flange 413 of the stop bracket 410 and the clutch drive plate 240 slides with respect to the clutch plate 242 until the next cam recess position is reached whereupon the play-back arm 43 drops down once more.

Switch E carried by the operating mechanism in the same position as switch C above described controls the operation of the motor 203 in response to the angular position of the cam so that the motor is halted at the appropriate time.

V. *Record delivery mechanism*

The operation of the record delivery mechanism depends on completion of the play-back arm movement as shown in Figures 30 to 33.

By a suitable bearing such as bushing **450*a* mounted to the supporting plate 11, a rotatable pivot post 450 is permitted to extend upwardly through the bushing and plate and to the top end of post 450 is attached arm 44. The lower extension of the post 450 terminates at the plane of the star lever 451. The star lever 451 is attached to and rotates with post 450. Star lever 451 has one arm 452 connected at its outer end to the tension spring 453 which in turn is connected to the spring support post 454 biasing the post 450** in a clockwise direction with respect to Figure 30.

An extension 466 of the star lever 451 co-acts with the stop post 465 to provide a limit to the clockwise movement of the star lever 451, the post 450 and the arm 491 provided by the spring 453.

The record delivery arm 44 is secured to the post 450 in a manner hereinafter described and by reason of the tension spring 453 acting on the post 450 is normally at a position shown in Figure 30.

Another extension 460 of the star lever 451 extends over the top surface of gear 216 in a position to be engaged by pivot member 300 for driving link 301 of the operating mechanism near the completion of the full 360° cycle of the operating mechanism at the time when the play-back arm has completed its outward swing but before the operating mechanism has come to rest.

The movement of the link pivot 300 against extension 460 of star lever 451 rotates the star lever 451, the post 450 and the record delivery arm 44 counterclockwise with respect to Figure 30 and in toward the turntable 41 to deliver the record in the manner hereinafter described.

At the completion of the operation of the operating mechanism for removing the play-back arm back to its original at rest position, the link pivot 300 passes and disengages extension 460 of the star lever 451 and tension spring 453 returns posts 450 and the record delivery arm 44 back against the stop post 456.

The record delivery arm 44 is secured to the post 450 through rubber grommets 480 by the screws 481 passing through the lock washers 482, the washers 483 and the spacers 484, the heads of the screws 481 clamping the spacers 484 to the pivot post 450 through the rubber grommets 480 allowing the record delivery arm to have resilient vertical as well as lateral play.

A backing plate 488 is held between the record delivery arm 44 and the post 450 for the purpose of limiting the follow through of the record delivery arm which would be permitted by the resilient grommets 480. The backing plate, therefore, restricts the forward movement of the record delivery arm to a position where the lip 55 of the record delivery arm and the slope 491 thereof moves just underneath a disc on the table without moving completely past the disc and snapping back over the top.

When the lip 55 moves under the disc 51 on the turntable 41, it lifts that end of the disc up causing the disc to be lifted up on the slope 491 of the record delivery arm 44 and lifting the record disc 51 off the spindle 50 and pin 52.

The engagement of the disc at the opposite side of the turntable which is still rotating spins the disc around the record delivery arm 44 to the other side thereof where it may either be spun off the turntable and base plate down into the record delivery slot or where on the snapping back of the record delivery arm 44 by tension spring 453 it may be pushed into the record delivery slot. The post 456 is provided to direct the ejected record toward its chute and not permit it to go to the left, thus missing the chute.

It is essential that the lip 55 slide on the surface of the turntable 41 and not at a point spaced slightly above the surface of the turntable 41. If it slides in contact with the surface of the turntable, it will lift up the record, but if it slides at a point slightly above the turntable it will tend to split the record.

However, since the record delivery arm is outside the periphery of the turntable, then it becomes extremely difficult unless other means are used to arrange the record delivery arm so that it will slide into proper engagement with the turntable surface.

This is another reason why the record delivery arm 44 is mounted for vertical as well as lateral compliance on the grommets 480. The normal position of the lip 55 of the record delivery arm outside the turntable is slightly below the surface of the turntable.

A cam member 495 is provided on the base plate 11 under the lip 55 of the record delivery arm 44 and extending up toward the turntable and so arranged that on inward movement of the record delivery arm 44 toward the turntable it will lift the lip 55 of the record delivery arm up toward and on to the surface of the turntable where the vertical compliance of the rubber grommets 480 will cause the lip 55 of the record delivery arm and the lower edge of the record delivery arm 44 to slide across the surface of the turntable in contact therewith so that the record may properly be engaged for delivery.

VI. *Anti-microphonic mounting of the base plate*

An essential element in the operation of the automatic recorder is to mount the base plate 11 in such manner that microphonism will be reduced and, in fact, eliminated between the loud speaker and other elements of the chassis on the one hand and the cutting arm, play-back arm, and other elements on the base plate on the other hand.

For this purpose I provide the simplified mounting shown in Figures 2, 34, 35 and 36 which affords a mounting for the base plate with both vertical and lateral compliance.

The side of the cabinet has secured thereto the longitudinal substantially U-shaped channels 500, the vertical wall 501 of which on each side is secured by bolts or other securing means passing through openings 502 in the wall of the channel.

The side flanges **11*b* of the base plate 11 carry secured thereto by bolts or rivets or in any other suitable manner the support brackets 510, the vertical wall 511 of which is secured to the flange 11*b* on each side in any suitable manner as by rivets or bolts passing through openings 512 in wall 511 and into registering openings in the flanges 11*b***.

The stationary bracket 500 has a horizontal ledge 515 parallel to and extending below the horizontal ledge 516 of the bracket 510 mounted on the panel 11.

Stationary bracket 500 also has the 45° ledge 520 extending parallel to the 45° ledge 521 of the bracket 510 secured to the base plate 11. The lower end of ledge 520 is re-entrantly bent at 522 to provide a positive retainer for the compression springs 525.

Compression springs 525 are mounted between the parallel 45° extensions 520 and 521, the said compression springs being supported in position by bolts 527 passing through openings 528 in the 45° ledge 521 through the top coil of the conical compression springs 525 and holding the springs 525 in position by the nuts 530.

In addition, recesses 532 in the horizontal flange 516 of bracket 510 are arranged to receive screws 535 which pass through appropriate washers and enter openings 537 in the horizontal ledge 515 securing the unit for shipping when tightened and permitting it to float on springs when loosened.

Thus, the support bracket 510 secured to the base plate 11 on each side rests on the support bracket 500 secured to the side wall of the cabinet on each side by resting on the compression springs 525 held between the diagonal or 45° flanges 520 and 521.

Microphonism and more particularly major shocks which occur when the machine is bumped during operation are absorbed by the diagonally placed springs which provide substantially equal freedom in vertical and horizontal planes.

VII.—*Electrical circuit and operation*

In the foregoing the invention has been described in connection with the individual operating mechanisms, the interpretation of which into a single composite unit makes possible automatically placing a record on the turntable, automatically making the record, automatically playing back the record, and automatically delivering the record.

The combination of all of these elements into a single unit for appropriate sequential operation is accomplished by the stepping switch shown in Figure 37 and the associated electrical circuits, the complete operation of which in connection with the various elements of apparatus hereinbefore described may be more readily understood by a comparison of the circuit diagram of Figure 37 with the chart of Figure 38.

The essential element in the control mechanism is a stepping switch comprising four discs each arranged to have contacts at the front and back and mounted for rotation simultaneously on a common axis by the stepping solenoid S.

The contact elements carried by each disc are arranged on the front and rear of the disc; therefore, the discs for purpose of identification in Figures 37 and 38 have been called I front, I rear, II front, II rear, III rear, IV front, IV rear. The stepping solenoid S is so arranged that when energized its armature S' is prepared for operation and when de-energized the armature S' causes all the discs I to IV to rotate simultaneously one step.

In the idling or at rest position, discs I front, I rear, and II front make no contacts. Contact 4 of disc II rear engages the lead 601. Contact 1 of disc III rear engages the lead 602. Disc IV front engages no contact. Contact 1 of the disc IV rear engages the lead 603 which connects through conductor 604 to signal light 1 which carries the legend "Drop quarter in slot below."

The current for energizing signal light 1 is from terminal 607 through the main on-off series switch J and the sold-out switch K to conductors 608, 609, 610, 611 to signal light 1, conductor 604, to contact 1 of disc IV rear, then through contact 11 of disc IV rear, conductors 612, 613 and 743, switch M, conductor 745, switch N, conductor 744, 617, 618 to terminal 620.

The cabinet light 621 connected across conductors 608 and 618 and, therefore, across the terminals 607 and 620 is in series with the main on-off switch and the sold-out switch J and K, respectively.

Therefore, signal light 1 and cabinet light 621 will be on as long as both switches J and K are closed. If either switches J and K are open, signal light 1 and cabinet light 621 will go out.

The closing of contact 4 rear II closes the circuit through lead 601 and conductor 622 to the elevator motor 120 when switch B is closed on contact 2 thereof.

This circuit is over the path from terminal 607, switches J and K, conductors 608, 609, 610, 611, 624 to switch B, switch contact B2, elevator motor 120, conductor 622, lead 601, contact 4 of disc II rear, contact 8 of disc II rear, lead 625, conductor 617, conductor 618, back to the opposite terminal 620.

The closing of contact 1 of disc III rear in the idle position of the device prepares the slug rejector coin return relay when switch contact B1 is closed over the following path: from terminal 607, switches J and K, conductors 608, 610, 611, 624, contact 1 of switch B, conductor 630, slug rejector relay R, conductor 631, lead 602, contact 1 of disc III rear, contact 11 of disc III rear, conductors 613, 743, switch M, conductor 745, switch N, conductors 744, 617, 618 to the opposite terminal 620.

Thus, if at the time a coin is dropped in the slot, contact B2 is closed and switch contact B1 is open, the elevator motor 120 will continue to operate until the top of the stack of records has been lifted to the proper position to open switch contact B2 and close switch contact B1. The slug rejector relay R will not be in circuit at that time owing to the fact that switch contact B1 is open until the stack of records has risen to the proper point to open switch contact B2 de-energizing the elevator motor 120 and to close switch contact B1 to energize the slug rejector relay R so that a coin will be accepted.

Therefore, if successive users of the device follow each other rapidly and it should happen that the elevator motor has not raised the stack of records to a sufficient height for proper operation of the record loading arm when the next quarter is dropped into the coin slot, then the slug rejector R cannot operate to accept the coin until the elevator motor has raised the record stack to an appropriate height to open switch B2 cutting off the motor and to close switch contact B1 to energize the slug rejector relay R.

At this point, the coin will be accepted and the operation will proceed. Switch A is normally set at contact 1 which is an open circuit contact. The coin when it is dropped momentarily closes switch contact A2 to energize solenoid S momentarily over the following path: from terminal 607, switches J and K, conductors 635 and 636, solenoid S, conductors 637 to contact 1A of the automatic manual switch 640, then through conductor 641 to switch contact A2, then through conductor 631 to III rear contacts 1 and 11 and through conductors 613 and 743, switch M, conductor 745, switch N, conductors 744, 617, 618 to the opposite terminal 620.

Switch contact A2, as above pointed out, is momentarily closed as the coin drops after it has been accepted. This closing, however, is sufficient to energize solenoid S to attract its armature S1. When the coin passes the switch A thereby permitting switch contact A2 to open, solenoid S is de-energized to permit its armature S' to move back and an appropriate mechanical connection well-known in the art is then provided between armature S1 and the set of discs I to IV to move the discs one step to the next set of contacts.

The remaining switches C, D and E are open. Switch C is closed on contact 1 which through conductor 642 is in series with contact 11 of disc I rear which in the idle position of the apparatus is an open contact. Switch D is open since it is closed on contact 1 which through conductor 643 is in series with contacts 2 and 12 of disc I rear which in the idle position of the apparatus do not engage any contacts.

Switch E is open since it is closed on contact E1 which through conductor 645 is in series with contacts 6, 7, and 8 of I front and 3 and 5 of I rear, all of which are open at the idle position. Switches F, G and H, hereinafter described, are open. Although switch P is closed, it has no function since, as hereinafter described, it is in series with the open switches F and G and contact 9 of II front which is open.

All of these last-mentioned switches come into operation at subsequent points in the stepping cycle and will be fully explained as they operate.

The idle position of the stepping switch construction has thus far been described. Also, as described the dropping of the coin momentarily closes the switch A2 to energize solenoid S to attract armature S'. The almost immediate opening of switch A2 de-energizes solenoid S to release armature S' and operate the stepping switch to the next position, which is the position for operation of the loading arm.

In this next or loading arm operating position, no contacts are engaged in discs I front, I rear, II front, and IV front of the stepping switch. Contacts 1 and 4 of disc II rear are engaged.

The most important function at this step, however, is performed by the movement of the stepping switch so that contact 2 of disc III rear closes a circuit to the record loading motor 203 to operate the record loading arm 40 to go through the record loading cycle. Contact 4, as previously described, prepares the elevator motor for operation when switch contact B2 is closed.

Contact 1 provides energy for the amplifier 650 over the following path: Front terminal 607, switches J and K, conductor 635, conductor 651, conductors 652, 653, to II rear contact 1, then through II rear contact 8, lead 625, conductors 617 and 618 to the opposite terminal 620. The turning on of the amplifier 650 at this point prepares the apparatus for making and playing the records.

The circuit for record loading motor 203 is from terminal 607, switches J and K, conductors 608, 609, 610, 611, 624, 655, record loading motor 203, conductor 656, III rear contact 2, then through III rear contact 11, conductors 613, 743, switch M, conductor 745, switch N, conductor 744, 617, 618 to the opposite terminal 620.

The movement of stepping switch disc IV rear to contact 2 lights signal panel No. 2 carrying the legend "Will place blank record on turntable."

The circuit for signal panel 2 is from terminal 607, switches J and K, conductors 608, 609, 610, 611, signal panel 2, conductor 660, IV rear contact 2, then through IV rear contact 11, conductors 612, 613, 743, 745, 744, 617, 618 to the opposite terminal 620.

When a record is removed from the top of the stack, then the record stack has lost height thereby closing contact B2 to operate the elevator motor 120 over the circuit previously described to raise the record stack.

As the record loading arm approaches the end of its operation, it closes switch contact C2 to energize the solenoid 7. At the end of its operation, it opens the switch contact C2 to de-energize the solenoid 7 and permit the armature S' to move the stepping switch to the next step.

Solenoid S is energized when switch contact C2 is closed over the following path: from terminal 607, switches J and K, conductors 635, 636, solenoid coil S, conductor 637, to contact 1A of the automatic manual switch 640, conductor 641 to switch contact C2, then through conductor 656, through contacts 2 and 11 of disc III rear, then through conductors 613 and 743, conductors 745, 744, 617, and 618 to the opposite terminal 620.

The energization and de-energization of solenoid S operates the stepping switch to the next position which is the position for placing the recording arm. At this next position, "Recording arm placement position," direct current from the direct current power supply 670 is passed through the record loading arm motor 203 through contact 11 of disc I rear which is closed and through switch contact C1.

This is for the purpose of braking the record loading motor to ensure that it will halt at the exact position where the record loading arm will be in registry with the stack and so that the record loading arm will not accidentally be moved away from its stop out of registry with the stack.

The circuit for applying direct current braking power to the record loading motor is from terminal 607, switches J and K, conductor 635, transformer 670*a*, conductors 720, 652, 653, contact 1 of disc II rear and through contact 8 of disc II rear and conductors 617 and 618 to terminal 620, to contact C1 of switch C.

Thus, transformer 670 is energized supplying a reduced voltage to its secondary which is connected to a rectifier 670*c*. The circuit, therefore, for the D. C. now originates at the rectifier and can be traced as follows: from minus terminal of 670*c* through conductors 635, 608, 609, 610, 611, 624, 655 through the record loading motor through contact C1, conductor 642, contacts 11 and 10 of I rear, conductors 672 and 671 to plus terminal of 670*c*, thus placing D. C. upon loader arm motor. It should be noted that transformer 670 is energized simultaneously with amplifier so that in the later description 670*c*, the D. C. rectifier will be considered as "live."

No contacts are engaged at this step for discs I front, II, front, and IV front. On disc II rear contacts 1 and 4 are still engaged so that amplifier 650 is still energized and the elevator motor 120 is still energized. Contact 3 of disc IV rear is engaged to light the signal panel 3 which lights up the legend "Lift the telephone when the turntable rotates."

The circuit for lighting up signal light 3 is from terminal 607, switches J and K, conductors 608, 609, 610, 611, light 3, conductor 675, contact 3 of disc IV rear, contact 11 of disc IV rear, conductors 612, 613, 743, 745, 744 and conductors 617, 618 to the opposite terminal 620.

Contact 3 of disc III rear is engaged to energize the cutter arm control motor 203a to place the cutting arm over the edge of the record. The energization of cutting arm motor 203a is from terminal 607, switches J and K, conductors 608, 609, 610, 611, 624, 676, cutter arm motor 203a, conductor 677, contact 3 of disc III rear to contact 11 of disc III rear, conductor 613, 743, 745, 744, conductors 617, 618 back to the opposite terminal 620.

When the cutting arm control motor moves the cutting arm to the point where the cutting arm is over the outer margin of the record, then it closes contact D2 energizing solenoid S momentarily and then opens contact D2 to de-energize solenoid S to step the stepping switch from the recording arm placement position to the record cutting position. The energization of solenoid S through switch D2 which is thus momentarily closed and then opened is from terminal 607, switches J and K, conductors 635 and 636, solenoid S, conductor 637 to contact 1A of the automatic manual switch 640, then through conductor 641 to switch contact D2, then through conductor 677 and contacts 3 and 11 of disc III rear, conductors 613, 743, 745, 744, conductors 617 and 618 to the opposite terminal 620.

The unit is now ready to cut a record. When the recording arm control motor 203a completes the placement of the recording arm over the edge of the record disc and permits the arm to be lowered, it is essential that the recording arm control motor 203a be positively halted in the position it then reaches so that the recording arm is left properly situated in engagement with the record blank.

For this purpose, contact 12 of disc I rear is engaged to place direct braking current from the braking current power supply 670 through the cutting arm control motor 203a through contact D1 over the following circuit: from minus of 670c through conductors 635, 608, 609, 610, 611, 624, 676 through the motor 203a, through D1, conductor 643 to contacts 12 and 10 of I rear, conductors 672 and 671 to plus of 670c, the D. C. source.

No contacts on disc I front and II front are engaged. Contact 1 of disc II rear remains engaged maintaining the energization of amplifier 650 during the record cutting cycle but contact 4 of disc II rear is disengaged so that elevator motor 120 is stopped during the record cutting cycle; the operation of the motor for the elevator will not then interfere with the efficient cutting of a modulated record groove in the record disc.

Contact 4 of disc III rear is engaged to energize the turntable motor 367 over the following path: from terminal 607 switches J and K, conductors 608, 609, 610, 611, 624, conductor 683, turntable motor 367, conductor 684, conductor 685, contact 4 of disc III rear to contact 11 of disc III rear, conductors 613, 743, 745, 744, 616, 617 and 618 to the opposite terminal 620.

Contact 9 of disc IV front is engaged to prepare the circuit to switches F, G and H over a path which will be described in connection with the operation of switches F, G and H. Contact 4 of disc IV rear is engaged to light signal panel 4 which carries the legend "Talk or sing into telephone," signal panel 4 being energized from terminal 607, switches J and K, conductors 608, 609, 610, 611, light 4, conductor 685, contacts 4 and 11 of disc IV rear, conductors 612, 613, 743, 745, 744, conductors 616, 617, 618, back to the opposite terminal 620.

Direct braking current is, of course, cut off from the record loading motor 203a since contact 11 of disc I rear has been moved to the open position.

The record cutting operation now proceeds under the control of turntable motor 367, feed screw 365, and cutter arm follower 350. About 15 seconds before the record is completed, the switch operating bracket 382 on follower arm 350 of the record cutting arm closes switch H to turn on the light panel 5 carrying a legend "You have 15 seconds to complete record."

The circuit for energization of light panel 5 through switch H is from terminal 607, switches J and K, conductors 608, 609, 610, 611, light 5, conductor 690, switch H, conductors 691, 692, contact 9 of disc IV front to contact 11 of disc IV front, conductor 693, conductors 612, 613, 743, 745, 744, conductors 616, 617, 618 back to the opposite terminal 620.

When the record cutting arm 42 reaches the end of the record cutting cycle, the switch actuating bracket 382 on follower 350 of the record cutting arm 42 closes the cutter limit switch F energizing the solenoid coil S over the following circuit: From terminal 607, switches J and K, conductors 635, 636, solenoid coil S, conductor 637 through contact 1a of the auto-manual switch and conductor 746 to normally closed switch P in series therewith and to conductor 701, conductor 702, to switch F, then through conductors 691 and 692, disc front IV, contacts 9 and 11, to conductors 693, 612, 613, 743, 745, 744, conductors 616, 617, 618 to the opposite terminal 620.

The closing of switch F resulting in energization of solenoid S results in the opening of switch P on actuation of armature S′ and since switch P is in series between solenoid S and switch F, the solenoid coil S is de-energized. The immediate return of solenoid armature S′ steps the stepping switch elements to the next operation which is the operation of recording arm removal.

This stepping operation disengages front IV contact 9 which is also in series with switches F and P and solenoid coil S so that the solenoid coil is not re-energized even though the cutter limit switch F remains closed until the cutter arm actually begins to move back.

It should here be noted in passing that although switch P opens on each energization of solenoid coil S and closes on each de-energization thereof, it performs no operation except when the circuit for solenoid S happens to pass through switch P as herein described in connection with cutter limit switch F and as hereinafter described in connection with the play-back arm limit switch G.

With the stepping switch now stepped to the position for removal of the record cutting arm, no contacts are made at stepping switch discs I front, I rear, II front, IV front, IV rear. Contact 4 of disc II rear is connected once more so that the elevator motor 120 may be energized if switch B2 happens to be open.

Thus, after the record cutting operation is completed, if the elevator motor has not yet raised the record stack to a point where the top record in the stack is at the right level thereby opening switch B2, then the elevator motor 120 is energized at this position of the stepping switch until the elevator stack has been raised to a proper level at which switch B2 will be open.

The continued engagement of contact 1 of disc II rear in circuit also maintains the energization of the amplifier at plug 650. Contact 5 of disc III rear is closed to energize the cutter arm control motor 203a to return the cutter arm from its upward position adjacent the center of the turntable out beyond the turntable.

The energization of cutter arm control motor 203a is from terminal 607, switches J and K, conductors 608, 609, 610, 611, 624, conductors 676, cutter arm motor 203a, conductor 677, through contacts 5 and 11 of disc III rear, then through conductors 613, 743, 745, 744, conductors 616, 617 and 618 to the opposite terminal 620.

At the position of the stepping switch for energizing the cutter arm control motor 203a to return the cutter arm, direct braking current is no longer supplied to the cutter arm control motor 203a since contact 12 on disc I rear which is in series with contact D1 is open. The limit switch F remains closed until the cutter arm is mechanically removed from the switch by the movement of the cutter arm pursuant to the operation of its control motor 203a. This switch, however, has no effect since the stepping switch has moved contact 9 of disc IV front to an open circuit position.

This is also true of the 15 second warning switch H. On completion of the cutting arm removal, pin 218 carried by gear 216 and cam 219 closes and then opens switch D2 to energize and then de-energize the solenoid coil S over the circuit previously described.

This results in operation of the stepping switch to the next position for the next function which is the operation of placing the play-back arm on the turntable.

At the play-back arm placement function of the stepping switch disc I front, II front, IV front have no function. Stepping switch II rear by maintaining the engagement of contacts 1 and 4 maintains the circuit for elevator motor 120 which will be energized when contact B2 is closed and the circuit for the amplifier at plug 650.

Contact 2 on disc I rear which is in parallel with contact 12 puts direct braking current on the recording arm control motor 203b through switch contact D1 through the circuit previously described in connection with contact 12 of disc I rear in order to ensure that the cutter arm control motor 203a will be stationary. Contact 6 of disc III rear is closed to energize the play-back control motor over the following circuit: From terminal 607, switches J and K, conductors 608, 609, 610, 611, 624, 705, play-back control motor 203b, conductors 706 and 707 through contacts 6 and 11 of disc III rear, then through conductors 613, 743, 745, 744, conductors 616, 617, 618 to the opposite terminal 620.

Contact 6 of disc IV rear is closed to light the signal panel 6 carrying the legend "Recordio will now play your record, then deliver it to you," the light signal 6 being energized from terminal 607, switches J and K, conductors 608, 609, 610, 611, light signal 6, conductor 708, contacts 6 and 11 of stepping switch disc IV rear, conductors 612, 613, 743, 745, 744, conductors 616, 617, 618 to the opposite terminal 620.

When the phonograph play-back arm 43 has been moved and lowered to the proper position to begin the playing of the record, contact E2 is closed and then opened to energize solenoid S and then de-energize it so that the stepping switch is stepped to the next position which is the record playing position.

During the record playing function, discs I front and II front do not close any circuits. Contact 3 of disc I rear is closed to place direct braking current on the control motor for the play-back arm through switch contact E1 to ensure that the control motor will remain halted.

The circuit for application of the braking force is over the following path: From minus of the energized D. C. rectifier 670c through conductors 635, 608, 609, 610, 611, 624, 705 through the motor 203b to switch contacts E1, conductor 645 through contacts 3 and 10 of disc I rear to the plus side of the D. C. source.

Contact 7 of disc III rear in parallel with contact 5 of disc III rear is closed to energize the motor 367 for the turntable over the circuit previously described in connection with contact 5 of disc III rear.

Contact 12 of disc IV front in parallel over conductor 692a with contact 9 of disc IV front is closed to prepare a circuit primarily for the phonograph limit switch G, although incidentally a circuit is also prepared for switches F and H which do not operate during the playing of the record.

Contact 7 of disc IV rear is closed to light the signal panel 7 which may carry a legend "For private listening use telephone; for loud speaker hang phone on cradle." Signal light 7 is energized from terminal 607, switches J and K, conductors 608, 609, 610, 611, light 7, conductor 725, contacts 7 and 11 of disc IV rear, conductors 612, 613, 743, 745, 744, conductors 616, 617, and 618 and back to terminal 620.

By this time, the elevator motor 120 has operated the record stack to a position where contact B2 has been opened by the top record in the stack and switch B is at contact 1. This operation does not necessarily occur at this time but does occur by approximately this position in the cycle of operation of the recording apparatus.

On completion of the play-back of the record, the play-back arm follower 400 closes the limit switch G. This operates a circuit in parallel with the circuit previously described for limit switch F to energize solenoid coil S through the switch P. The armature S′ is pulled over opening the switch P and on consequent de-energization of the solenoid the armature S′ moves back to operate the stepping switch to the next position.

The opening of switch P on energization of the solenoid coil S, therefore, results in de-energization of the solenoid to perform the stepping operation so that even though switch G remains closed at the beginning of the play-back arm removal, the operation of the stepping switch so that neither contacts 9 or 12 of disc IV front are now closed prevents further energization of the solenoid by reason of the fact that switch G which is in series therewith is closed.

In operation of the stepping switch to the next operation, which is the removal of the play-back arm beyond the record, discs I front, I rear, II front do not make any contacts. Disc II rear still engages its contacts 1 and 4 so that the amplifier is still on and the elevator motor may still operate. Disc III rear is closed on contact 8 which is in parallel with contact 6 and the circuit previously described in connection with contact 6 wherein disc III rear operates the play-back arm control motor to raise the play-back arm and rotate it out from its position over the turntable.

Disc IV front does not have any contacts engaged at this point. Disc IV rear engages contact 8 which operates turntable motor over the path of terminal 607, switches J and K, conductors 608, 609, 610, 611, 624, 683, turntable motor 367, conductors 684, 728, contacts 8 and 11 of disc IV rear, conductors 612, 613, 743, 745, 744, conductors 616, 617 and 618 to the opposite terminal 620.

Direct current is no longer placed on the control motor 203b of the play-back arm through contact E1 since contact 3 of disc I rear is open. Although switch G remains closed at the beginning of the cycle, it has no function since the stepping of the step switch has moved contacts 12 and 9 of disc IV front out of engagement and has broken the circuit at that point.

At the completion of the removal of the phonograph arm, pin 218 carried by gear 216 and cam 219 of the phonograph control apparatus closes switch E2 and then opens it. This energizes solenoid S over the path from terminal 607, switches J and K, conductors 631, 636, solenoid coil S, conductors 637 to contact 1A of the automatic manual switch 640, to conductor 641, switch contact E2, conductor 706 to contacts 8 and 11 of disc III rear, conductors 613, 743, 745, 744, conductors 616, 617 and 618 back to the opposite terminal 620.

Switch E2 closes only momentarily as above described to energize the solenoid S. On deenergization of solenoid S it operates the stepping switch to the next position which is a self-stepping position and is the first of four self-stepping positions.

At self-stepping position 1, discs I front, III rear, IV front, and IV rear make no contact. Contact 5 of disc I rear puts direct current source 670C on the play-back arm control motor 203b through contact E1 over the following path: From minus 670C through conductors 635, 608, 609, 610, 611, 624, 705 to motor 203b to contact E1, through conductor 645 to contacts 5 and 10 of disc I rear to the plus side of the D. C. source 670C.

Contacts 1 and 4 on disc II rear remain energized through each of the four self-stepping positions to maintain the energization of the amplifier at plug 650 and the elevator motor 120 and the energization of the D. C. source 670C.

Contact 9 of disc II front results in energization of the solenoid coil S through the switch P over the path from terminal 607, switches J and K, conductors 635, 636, solenoid coil S, conductor 637 through 1*a* of automatic manual switch, conductor 746, switch P, conductor 701, conductor 730, contacts 9 and 8 of disc II front, conductors 731, 617, 618, back to the opposite terminal 620.

This energizes the solenoid coil S to attract its armature S′ opening the switch P, thereby de-energizing the solenoid S so that armature S′ is brought over once more to operate the stepping switch to self-stepping position 2.

At self-stepping position 2, discs I rear, III rear, and IV front engage no contacts. Contact 6 of disc I front is in parallel with contact 5 of disc I rear to place direct braking current on the play-back arm control motor 203b over the following path: From minus of 670C through conductors 635, 608, 609, 610, 611, 624, 705, motor 203b, contact E1, conductor 645 to contacts 6 and 10 of I front, conductor 671 to plus side of D. C. source.

Since contacts 6, 7, and 8 of I front are all parallel, in ensuing self-stepping positions the D. C. is applied to the play-back arm control motor 203b over the same circuit as that just described.

Contact 10 of disc IV rear is engaged to operate the counter 735 which will register one sale or one play on energization through contact 10 of disc IV rear from terminal 607, switches J and K, conductors 608, 609, 610, 737, counter relay 735, conductor 738, contacts 10 and 11 of disc IV rear, conductors 612, 613, 743, 745, 744, conductors 616, 617, 618 to the opposite terminal 620.

Since contacts 8 and 9 of disc II front are still engaged, the solenoid coil S is again energized through the switch P to attract its armature S′ resulting in the opening of switch P. The resulting deenergization of solenoid coil S causes the switch to step to self-stepping position 3 where contacts 8 and 9 of disc II front are still energized. Contact 7 of disc I front in parallel with contact 6 of disc I front places direct current on the play-back control motor 203b through switch E1 in parallel with the path previously described for contact 6 of disc I front and contact 5 of disc I rear.

Since contacts 8 and 9 of disc II front are still engaged at self-stepping position 3 and since these contacts are in series with solenoid S and switch P, solenoid S is energized once more to attract its armature S′.

This again results in opening of the switch P to deenergize the solenoid and result in the return of armature S′ to operate the stepping switch to the next position.

Contact 8 of disc I front in parallel with contacts 6 and 7 of disc I front continues to supply direct braking current to the play-back arm control motor 203b through switch contact E1. Since contacts 8 and 9 of switch II front are still connected in circuit, solenoid S is again energized, but the energization thereof to attract the armature S′ opens switch P to permit the return of armature S′ to operate the stepping switch back to the original idling position at which discs I front, I rear, II front, and IV front make no contact.

Disc II rear is connected at 4 so that the elevator motor 120 may still operate but is disconnected at contact 1 so that the amplifier and D. C. source are disconnected and disc III rear is connected at contact 1 so that the slug rejector is again prepared.

Disc IV is again at contact 1 so that the No. 1 signal light is again on. In the event the sold-out switch K is opened by raising the record platform 60 to its greatest height, it will be seen that the opening of this switch breaks all circuits since the return to terminal 607 is broken.

Switch B then recloses on contact 2 so that the elevator motor 120 will be prepared to run owing to the fact that there are no records in the stack. The opening of sold-out switch K prevents the operation even of motor 120.

Since the sold-out switch K is opened, light 1 would also be out so that the legend "Drop quarter in slot below," would no longer be visible.

The cabinet light 621 will also be extinguished on opening of the sold-out switch K so that a user will then know that the machine is not in condition for operation.

By this means, therefore, a simplified automatic sequential operation of all of the elements of the novel coin recorder and play-back device may be achieved.

During servicing of the machine, it is necessary at times to set the machine to perform a particular operation which must be adjusted. Thus, for instance, if it should be found that the play-back arm operation is not correct either in that the arm does not meet the record at the right point or lifts up too soon, it would be a waste of time to make it necessary for the serviceman to run the machine through all of its cycles until the play-back cycle is reached.

Accordingly, the novel device herein set forth provides simplified means by which a serviceman may set the stepping switch mechanism for the desired operation and for operating the particular function which is desired.

Thus, when the serviceman desires to test for a particular operation, he moves the automatic manual switch 640 which is a double pole switch from its contact 1 to the contact 2. A circuit is then prepared by which on closing the switch 740 which is spring biased open, the serviceman may energize the solenoid S which on de-energization will move the stepping switch to its next position.

If, for instance, he desires to open the stepping switch to the playing arm placing position, he would then close switch 740 five times which would then result in placement of the stepping switch at the playing arm placing position.

The closing of switch 740 energizes solenoid S from terminal 607 through switches J and K, conductors 635, and 636, coil S, conductor 637 to contact 2A of automatic manual switch 640, conductor 741, manual stepping switch 740, conductor 742, conductors 617, 618 to the opposite terminal 620.

Thus, by pressing switch 740 the appropriate number of times since switch 740 is biased open, opening switch 740 the appropriate number of times will result in the appropriate number of energizations and de-energizations of solenoid S to operate the stepping switch to the right position.

Thereafter, when it is desired to operate the specific function, the manual run switch M must be closed and held closed, it being spring biased to the open position as long as it is desired to operate the specific function.

Thus, when it is desired to adjust the appropriate stops which determine where the playing arm is to set down at the edge of a record, the serviceman would first move the switch 640 to the contact 2 position, thereby setting the circuits for manual operation. He would then press and release the switch 740 five times which would close and open the solenoid 5 in a manner above described, which would result in the stepping switch being positioned for operating the phono arm motor **203*b*. The circuit to the motor 203*b*, however, is open since the contact arms of switch 640 are in position 2** the manual position.

However, when the manual run switch M is closed, the circuit to motor **203*b* is established as follows: From terminal 607, switches J and K, conductors 608, 609, 610, 611, 624, 705, motor 203*b*, conductors 706, 707, contacts 6 and 11 of disc III rear, conductors 613, 743 through switch M to contact 2 of switch M, conductors 747, 744, 616, 617, 618 to terminal 620. Thus, the motor 203*b* will operate as long as the switch M of contact 2** is maintained.

In normal automatic operation, the various function motors 203, **203*a* and 203*b*** are permitted to operate to a specific point in their cycle, whereupon the stepping switch is caused to advance and in the ensuing position places D. C. braking current on the motor which up till that time had been running.

In manual operation, however, the stepping switch does not step to the next position when a specific portion of the function motors has been reached. Thus, in manual operation it is necessary to provide a D. C. braking circuit which does not depend upon the advancement of the stepping switch to the next position but will cause D. C. to be applied to the particular motor which is being manually run by simply releasing the manual run button, thereby opening the circuit which permitted it to run and closing another circuit which applies the D. C. braking current to the same motor.

This circuit is as follows: Assuming that the auto manual switch has been placed on the #2 contacts, the manual stepping switch has been closed and opened five times, the stepping switch has been advanced to the position in which contact 6 disc III rear is made. Then, when the manual run switch M is pressed to contact 2 the phono arm control motor **203*b* is operated through a circuit previously described. At any time that the manual run switch M is released, thereby opening the operating circuit to the motor, contact 1** of switch M is closed, switch M being a single pole double throw switch.

The contact M1 causes D. C. braking current to be applied to the control motor **203*b* through a circuit as follows: From minus terminal of D. C. rectifier 670C through conductors 635, 608, 609, 610, 611, 624, 705, to the motor 203*b*, conductors 706, 707 to contacts 6 and 11 of disc III rear, conductors 613, 743, contact M1, conductor 745 through switch contact 640—2, conductors 748, 749, 672, 671 to the plus terminal of 670C**.

It should be noted that this circuit does not include switch E associated with the control motor **203*b*. Thus, the motor 203*b*** can be run by pressing switch M and stopped instantly by releasing switch M, and the braking does not depend on the motor being in any specific part of the cycle.

The serviceman, therefore, can advance the various function or control motors as little or as much as he wishes and upon releasing the switch M the motor will stop. He, therefore, has good control of all motors and can make various adjustments with precision.

After a serviceman has used the manual operation features of the device, it is necessary that he return each portion of the total mechanism to its normal condition in order that it may properly function when returned to automatic operation. To do this not only must each control motor be returned to its proper half of its cycle, but the timing of that cycle must be correct with respect to the associated switch which closes the circuit to the solenoid.

Thus, after the serviceman has operated the phono arm control motor **203*b* manually, before he returns the equipment to automatic operation he must press switch M, thereby running motor 203*b*** and hence cycles the phono arm until it is moving away from the turntable and is returning to its off the table at rest position.

A test lamp 749 is provided which is parallel to the solenoid so that when switch E closes the contact 2 during the above manual operation, a circuit is established to light the lamp 749, which shows the operator that had he been in automatic position the solenoid would have closed. The operator continues to press switch M, thereby continuing to run motor 203b until switch E breaks contact 2 and returns to contact 1. The lamp now goes out and the operator knows that the solenoid would have been released had he had the machine in automatic operation.

As soon as the lamp 749 is extinguished, the operator releases switch M, thereby stopping the motor 203b in the correct part of the cycle. The test lamp 749, therefore, serves as a phasing lamp for arranging the various control motors in the proper circuit timing prior to returning the equipment to automatic operation.

The circuit to the test lamp 749 is as follows: In the above described instance when the operator has run motor 203b until switch E closed to contact 2—from terminal 607, switches J and K, conductors 635, 750, test lamp 749, conductors 751, 746, 641, contact E2, conductors 706, 707, contacts 6 and 11 of disc III rear, conductors 613, 743, contact M2, conductors 747, 744, 616, 617, 618 to terminal 620.

When switch E2 breaks, the test lamp 749 is, of course, extinguished.

Since switch M has on one terminal A. C. and on the other terminal D. C., it was found that if during manual operation when pressing and releasing switch M an arc were to form when M2 was breaking, the result was to apply A. C. to contact M1, the D. C. contact in manual operation.

Thus, under certain conditions it was found that A. C. could get across the D. C. rectifier 670C and burn it out. In order to assure that no arc would form which could cause A. C. to be applied to contact M1, a small condenser was placed across switch M2.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. An automatic phonograph having a horizontal turntable and a horizontal record loading arm pivoted outside said turn-table; a record loading arm; means at the end of the arm remote from the point releasably engageable with a record disc; means for supporting a stack of records outside the turn-table; said arm being movable over said stack and toward said stack to engage the top record in said stack and over said turn-table and toward said turn-table to deposit the record on said turn-table; the center of the record stack and the center of the turntable being equidistant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; and additional switch means responsive to the absence of records on the platform for de-energizing said platform raising means; switch means responsive to operation of another portion of said automatic phonograph to de-energize said platform raising means.

2. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turn-table to deposit the record on said turn-table; the center of the record stack and the center of the turntable being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm.

3. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turn-table to deposit the record on said turn-table; the center of the record stack and the center of the turntable being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm; said switch actuating arm being mounted to yield in a vertical plane; said platform raising means being de-energized when said switch actuating arm is at a predetermined level and above said predetermined level and being energized when said switch actuating arm is below said predetermined level.

4. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turn-table to deposit the record on said turn-table; the center of the record stack and the center of the turntable being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm; said switch actuating arm being mounted to yield in a vertical plane; said platform raising means being de-energized when said switch actuating arm is at a predetermined level and above said predetermined level and being energized when said switch actuating arm is below said predetermined level, and means responsive to the operation of another portion of said automatic phonograph for de-energizing said platform raising means while said switch actuating arm is below said predetermined level.

5. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turn-table to deposit the record on said turn-table; the center of the record stack and the center of the turn-table being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm; said switch actuating arm being mounted to yield in a vertical plane; said platform raising means being de-energized when said switch actuating arm is at a predetermined level and above said predetermined level and being energized when said switch actuating arm is below said predetermined level, and means responsive to the operation of another portion of said automatic phonograph for de-energizing said platform raising means while said switch actuating arm is below said predetermined level; coin control means for initiating the operation of said automatic phonograph; means responsive to the positioning of said switch actuating arm below said predetermined level to disable said coin control means.

6. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turn-table to deposit the record on said turn-table; the center of the record stack and the center of the turn-table being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm; said switch actuating arm being mounted to yield in a vertical plane; said platform raising means being de-energized when said switch actuating arm is at a predetermined level and above said predetermined level and being energized when said switch actuating arm is below said predetermined level; and additional switch means responsive to the raising of the record platform to a predetermined height to de-energize said automatic phonograph.

7. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turn-table to deposit the record on said turn-table; the center of the record stack and the center of the turn-table being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm; said switch actuating arm being mounted to yield in a vertical plane; said platform raising means being de-energized when said switch actuating arm is at a predetermined level and above said predetermined level and being energized when said switch actuating arm is below said predetermined level, and means responsive to the operation of another portion of said automatic phonograph for de-energizing said platform raising means while said switch actuating arm is below said predetermined level, and additional switch means responsive to the raising of the record platform to a predetermined height to de-energize said automatic phonograph.

8. An automatic phonograph having a horizontal turn-table and a horizontal record loading arm pivoted outside said turn-table; a record loading arm; means at the end of the arm remote from the pivot releasably engageable with a record disc; means for supporting a stack of records outside the turntable; said arm being movable over said stack and toward said stack to engage the top record in said stack and over said turn-table and toward said turntable to deposit the record on said turn-table; the center of the record stack and the center of the turn-table being equi-distant from said pivot; the top record of the stack being at a predetermined position to be engaged by said record engaging means of said arm; a platform for supporting said stack; means for raising said platform; said last-mentioned means being electrically operated; switch means controlled by the height of the top record in the stack for energizing said platform raising means; said switch means including a switch actuator comprising an arm extending over the record stack; the top record of the stack being slidable laterally with respect to said switch actuating arm; said switch actuating arm being mounted to yield in a vertical plane; said platform raising means being de-energized when said switch actuating arm is at a predetermined level and above said predetermined level and being energized when said switch actuating arm is below said predetermined level, and means responsive to the operation of another portion of said automatic phonograph for de-energizing said platform raising means while said switch actuating arm is below said predetermined level; coin control means for initiating the operation of said automatic phonograph; means responsive to the positioning of said switch actuating arm below said predetermined level to disable said coin control means; and additional switch means responsive to the raising of the record platform to a predetermined height to de-energize said automatic phonograph.

9. Combined automatic recording and play-back mechanism comprising a rotatable horizontal turn-table; a stack of records adjacent the turn-table and sequentially operated record loading arm, recording arm and play-back arm, each of said arms extending horizontally in planes parallel to said turn-table and above said turn-table; each of said arms being rotatable in a horizontal plane from a position away from said turn-table to a position over said turntable; and each of said arms being movable vertically; operating mechanism individual to each of said arms; each of said individual operating mechanisms being substantially identical and interchangeable; each of said arms being secured to a vertical post; said post being rotatable and being also vertically slidable; a connection between the operating mechanism for each arm and the post for rotating the post and another connection between the operating mechanism for each arm and the post for raising and lowering the post; the operating mechanism for the recording arm and play-back arm raising the post prior to the inception of any rotational movement thereof and lowering the post at the end of any rotational movement thereof; the connection between the operating mechanism for each post and its post for rotating the post including releasable driving and driven members; said releasable driving and driven members being engaged when the post is raised and disengaged when the post is lowered; said releasable driving members comprising a clutch driving plate and a driven plate; a frictional connection between said driving plate and said driven plate; said clutch driving plate being connected to said operating mechanism; said plates being rotatable about said post; said post being slidable vertically with respect to said plates; and means responsive to the raising of said post to interengage the post and driven plate for angular rotation of the post.

10. Combined automatic recording and play-back mechanism comprising a rotatable horizontal turn-table; a stack of records adjacent the turn-table and sequentially operated record loading arm, recording arm and play-back arm, each of said arms extending horizontally in planes parallel to said turn-table and above said turn-table; each of said arms being rotatable in a horizontal plane from a position away from said turn-table to a position over said turn-table; and each of said arms being movable vertically; operating mechanism individual to each of said arms; each of said individual operating mechanisms being substantially identical and interchangeable; each of said arms being secured to a vertical post; said post being rotatable and being also vertically slidable; a connection between the operating mechanism for each arm and the post for rotating the post and another connection between the operating mechanism for each arm and the post for raising and lowering the post; the operating mechanism for the recording arm and play-back arm raising the post prior to the inception of any rotational movement thereof and lowering the post at the end of any rotational movement thereof; the connection between the operating mechanism for each post and its post for rotating the post including releasable driving and driven members; said releasable driving and driven members being engaged when the post is raised and disengaged when the post is lowered; said releasable driving members comprising a clutch driving plate and a driven plate; a frictional connection between said driving plate and said driven plate; said clutch driving plate being connected to said operating mechanism; said plates being rotatable about said post; said post being slidable vertically with respect to said plates; and means responsive to the raising of said post to interengage the post and driven plate for angular rotation of the post; said last-mentioned means being released on lowering of the post.

11. Combined automatic recording and play-back mechanism comprising a rotatable horizontal turn-table; a stack of records adjacent the turn-table and sequentially operated record loading arm, recording arm and play-back arm, each of said arms extending horizontally in planes parallel to said turn-table and above said turn-table; each of said arms being rotatable in a horizontal plane from a position away from said turn-table to a position over said turntable; and each of said arms being movable vertically; operating mechanism individual to each of said arms; each of said individual operating mechanisms being substantially identical and interchangeable; each of said arms being secured to a vertical post; said post being rotatable and being also vertically slidable; a connection between the operating mechanism for each arm and the post for rotating the post and another connection between the operating mechanism for each arm and the post for raising and lowering the post; the operating mechanism for the recording arm and play-back arm raising the post prior to the inception of any rotational movement thereof and lowering the post at the end of any rotational movement thereof; the connection between the operating mechanism for each post and its post for rotating the post including releasable driving and driven members; said releasable driving and driven members being engaged when the post is raised and disengaged when the post is lowered; said releasable driving members comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly.

12. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; and means responsive to the raising of said post to interengage the post and driven plate for angular rotation of the post.

13. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly.

14. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; and means responsive to the raising of said post to interengage the post and driven plate for angular rotation of the post; said last-mentioned means being released on lowering of the post.

15. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged.

16. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a horizontal member carried by said post; an upwardly directed pin carried by said horizontal member; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged.

17. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a horizontal member carried by said post; an upwardly directed pin carried by said horizontal member; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged; an additional horizontal stabilizing member carried by said post, said stabilizing member extending from said post in a direction at a substantial angle to said first-mentioned horizontal member; a stationary rod parallel to said post; said stabilizing member continuously and slidably engaging said rod.

18. In an automatic sound translating device having a rotatable horizontal turn-table; a substantially horizontal arm; said arm being movable in a vertical plane and being rotatable in a horizontal plate; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a horizontal member carried by said post; an upwardly directed pin carried by said horizontal member; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged; an additional horizontal stabilizing member carried by said post, said stabilizing member extending from said post in a direction at a substantial angle to said first-mentioned horizontal member; a stationary rod parallel to said post; said stabilizing member continuously and slidably engaging said rod; said stabilizing member being rotatably mounted on said post.

19. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a horizontal member carried by said post; an upwardly directed pin carried by said horizontal member; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged; an additional horizontal stabilizing member carried by said post, said stabilizing member extending from said post in a direction at a substantial angle to said first-mentioned horizontal member; a stationary rod parallel to said post; said stabilizing member continuously and slidably engaging said rod; resiliently deformable means frictionally interconnecting said stabilizing member and said post.

20. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a horizontal member carried by said post; an upwardly directed pin carried by said horizontal member; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged; an additional horizontal stabilizing member carried by said post, said stabilizing member extending from said post in a direction at a substantial angle to said first-mentioned horizontal member; a stationary rod parallel to said post; said stabilizing member continuously and slidably engaging said rod; resiliently deformable means frictionally interconnecting said stabilizing member and said post; said resiliently deformable means being progressively deformed to an increased extent as the post is raised to increase the friction at the connection between the stabilizer member and the post.

21. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged; a crank secured to said post; a toggle plate hingedly carried by said crank; said toggle plate having an opening embracing said post; a spring; the end of said toggle plate opposite its connection to the crank being connected to one end of said spring; the opposite end of said spring being connected to a stationary element; said stationary element, said connection of the toggle plate to the spring, and said hinged connection of said toggle plate to said crank initially extending in a straight line.

22. In an automatic sound translating device having a rotatable horizontal turn-table; a substantially horizontal arm; said arm being movable in a vertical plane and being rotatable in a horizontal plane; a vertical rotatable post carrying said arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the arm at predetermined limits of horizontal rotation thereof; said clutch driving plate and driven plate sliding with respect to each other on continued operation of said operating mechanism when the stop members are engaged; a crank secured to said post; a toggle plate hingedly carried by said crank; said toggle plate having an opening embracing said post; a spring; the end of said toggle plate opposite its connection to the crank being connected to one end of said spring; the opposite end of said spring being connected to a stationary element; said stationary element, said connection of the toggle plate to the spring, and said hinged connection of said toggle plate to said crank initially extending in a straight line; rotation of said post, record loading arm and crank in one direction causing said toggle plate to be engaged by said post as the said members reach one limit of horizontal rotation; said toggle plate thereafter being moved to a position where its point of connection to the spring is out of line with the stationary element and hinged connection of the toggle plate to the crank; said spring being thereby extended and biasing said post away from said limit.

23. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged.

24. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged; a record stack located adjacent said turn-table; said stop members being located to halt the record loading arm when it extends above the center of said stack and to halt the record loading arm when it extends above the center of said turn-table.

25. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged; said record loading arm carrying at its end opposite the post apparatus for picking up a record from the stack and dropping it on the turn-table.

26. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged; resilient means connected to said post; means carried by said post for extending said resilient means when said record loading arm approaches one limit of horizontal rotation; said resilient means thereafter biasing said post and arm for rotation away from said limit.

27. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged; a crank secured to said post; a toggle plate hingedly carried by said crank; said toggle plate having an opening embracing said post; a spring; the end of said toggle plate opposite its connection to the crank being connected to one end of said spring; the opposite end of said spring being connected to a stationary element.

28. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged; a crank secured to said post; a toggle plate hingedly carried by said crank; said toggle plate having an opening embracing said post; a spring; the end of said toggle plate opposite its connection to the crank being connected to one end of said spring; the opposite end of said spring being connected to a stationary element, said stationary element, said connection of the toggle plate to the spring, and said hinged connection of said toggle plate to said crank initially extending in a straight line.

29. In an automatic sound translating device having a rotatable horizontal turn-table; a substantially horizontal record loading arm; said record loading arm being movable in a vertical plane and being rotatable in a horizontal plane; a vertical rotatable post carrying said record loading arm; said post being vertically slidable; operating mechanism; and a connection between said operating mechanism and said post comprising a clutch drivng plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record loading arm at predetermined limits of horizontal rotation thereof; said clutch driving plate and driven plate sliding with respect to each other on continued operation of said operating mechanism when the stop members are engaged; a crank secured to said post; a toggle plate hingedly carried by said crank; said toggle plate having an opening embracing said post; a spring; the end of said toggle plate opposite its connection to the crank being connected to one end of said spring; the opposite end of said spring being connected to a stationary element, said stationary element, said connection of the toggle plate to the spring, and said hinged connection of said toggle plate to said crank initially extending in a straight line; rotation of said post, record loading arm and crank in one direction causing said toggle plate to be engaged by said post as the said members reach one limit of horizontal rotation; said toggle plate thereafter being moved to a position where its point of connection to the spring is out of line with the stationary element and hinged connection of the toggle plate to the crank; said spring being thereby extended and biasing said post away from said limit.

30. In an automatic sound translating device having a rotatable horizontal turn-table; a substantially horizontal record cutting arm; said record cutting arm being movable in a vertical plane and being rotatable in a horizontal plane; a vertical rotatable post carrying said record cutting arm; said post being vertically slidable; operating mechanism; and a connection between said operating mechanism and said post comprising a clutch driving plate and a driven plate; a frictional connection between said drivng plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record cutting arm at predetermined limits of horizontal rotation thereof; said clutch driving plate and driven plate sliding with respect to each other on continued operation of said operating mechanism when the stop members are engaged.

31. In an automatic sound translating device having a rotatable horizontal turn-table; a substantially horizontal record cutting arm; said record cutting arm being movable in a vertical plane and being rotatable in a horizontal plane; a vertical rotatable post carrying said record cutting arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record cutting arms at predetermined limits of horizontal rotation thereof; said clutch driving plate and driven plate sliding with respect to each other on continued operation of said operating mechanism when the stop members are engaged; said stop members being located to halt the record cutting arm when it extends along a line outside the turn-table and to halt the record cutting arm when the free end thereof extends along a margin of a record on the turn-table.

32. In an automatic sound translating device having a rotatable horizontal turn-table; a substantially horizontal record cutting arm; said record cutting arm being movable in a vertical plane and being rotatable in a horizontal plane; a vertical rotatable post carrying said record cutting arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record cutting arm at predetermined limits of horizontal rotation thereof; said clutch driving plate and driven plate sliding with respect to each other on continued operation of said operating mechanism when the stop members are engaged; said stop members being located to halt the record cutting arm when it extends along a line outside the turn-table and to halt the record cutting arm when the free end thereof extends along a margin of a record on the turn-table; additional driving means for driving the record cutting arm after it engages the last-mentioned stop.

33. In an automatic sound translating device having a rotatable horizontal turn-table; a substantially horizontal record play-back arm; said record play-back arm being movable in a vertical plane and being rotatable in a horizontal plane; a vertical rotatable post carrying said record play-back arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record play-back arm at predetermined limits of horizontal rotation thereof; said clutch driving plate and driven plate sliding with respect to each other on continued operation of said operating mechanism when the stop members are engaged.

34. In an automatic sound translating device having a rotatable horizontal turn-table; a substantially horizontal record play-back arm; said record play-back arm being movable in a vertical plane and being rotatable in a horizontal plane; a vertical rotatable post carrying said record play-back arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record play-back arm at predetermined limits of horizontal rotation thereof; said clutch driving plate and driven plate sliding with respect to each other on continued operation of said operating mechanism when the stop members are engaged; said stop members being located to halt the record play-back arm when it extends along a line outside the turn-table and to halt the record play-back arm when the free end thereof extends along a margin of a record on the turn-table.

35. In an automatic sound translating device having a rotatable horizontal turn-table; a substantially horizontal record play-back arm; said record play-back arm being movable in a vertical plane and being rotatable in a horizontal plane; a vertical rotatable post carrying said record play-back arm; said post being vertically slidable; operating mechanism; and a connection between said operating mechanism and said post comprising a clutch driving plate and a driven plate; a frictional connection between said driving plate and said driven plate; said clutch driving plate being connected to said operating mechanism; said plates being rotatable about said post; said post being slidable vertically with respect to said plates; a pin carried by said post; recesses in said driven plate; said pin engaging the recesses in said driven plate when the post is raised to drive the post angularly; stop members engageable by the record play-back arm at predetermined limits of horizontal rotation thereof; said clutch driving plate and driven plate sliding with respect to each other on continued operation of said operating mechanism when the stop members are engaged; said stop members being located to halt the record play-back arm when it extends along a line outside the turn-table and to halt the record play-back arm when the free end thereof extends along a margin of a record on the turn-table; said play-back arm being thereafter driven by the groove of the record.

ROBERT M. CAIN.

REFERENCES CITED

The following references are of record in the file of this patent:

UNITED STATES PATENTS

| Number | Name | Date |
|---|---|---|
| 1,935,140 | Buckle | Nov. 14, 1933 |
| 1,936,335 | Mitchell et al. | Nov. 21, 1933 |
| 2,115,653 | Snyder | Apr. 26, 1938 |
| 2,129,612 | White | Sept. 6, 1938 |
| 2,183,985 | Clark | Dec. 19, 1939 |
| 2,293,723 | Erickson | Aug. 25, 1942 |
| 2,342,411 | Lissiansky | Feb. 22, 1944 |
| 2,437,557 | Rockola et al. | Mar. 9, 1948 |
| 2,475,302 | Adams | July 5, 1949 |